United States Patent
Yu et al.

(10) Patent No.: US 10,901,947 B2
(45) Date of Patent: Jan. 26, 2021

(54) METHOD FOR RECOGNIZING INFREQUENTLY-USED DATA AND TERMINAL

(71) Applicant: Huawei Technologies Co., Ltd., Shenzhen (CN)

(72) Inventors: Yanhui Yu, Shanghai (CN); Zhonglin Xia, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 193 days.

(21) Appl. No.: 16/082,120

(22) PCT Filed: Jul. 28, 2016

(86) PCT No.: PCT/CN2016/092079
§ 371 (c)(1),
(2) Date: Sep. 4, 2018

(87) PCT Pub. No.: WO2018/018505
PCT Pub. Date: Feb. 1, 2018

(65) Prior Publication Data
US 2019/0095385 A1  Mar. 28, 2019

(51) Int. Cl.
*G06F 16/17* (2019.01)
*G06F 16/16* (2019.01)
*G06F 16/906* (2019.01)
*G06F 16/14* (2019.01)

(52) U.S. Cl.
CPC ........ *G06F 16/1727* (2019.01); *G06F 16/162* (2019.01); *G06F 16/906* (2019.01); *G06F 16/156* (2019.01)

(58) Field of Classification Search
None
See application file for complete search history.

(56) References Cited

U.S. PATENT DOCUMENTS

| 2006/0117008 A1 | 6/2006 | Shimogori |
| 2015/0088940 A1* | 3/2015 | Stokely ................. G06F 3/0617 707/827 |

FOREIGN PATENT DOCUMENTS

| CN | 102867041 A | 1/2013 |
| CN | 103092938 A | 5/2013 |

(Continued)

OTHER PUBLICATIONS

Machine Translation and Abstract of Chinese Publication No. CN103092938, May 8, 2013, 7 pages.

(Continued)

*Primary Examiner* — Amresh Singh
(74) *Attorney, Agent, or Firm* — Rimon PC

(57) ABSTRACT

A method for recognizing infrequently-used data includes scanning files in storage space according to a first scanning rule, generating a file set according to the scanned files, for each file in the file set, obtaining a last access time of the file, where the last access time indicates a time when the file was last accessed and not modified, obtaining a file attribute of the file, querying an infrequently-used file recognition condition corresponding to the file attribute, and when the last access time of the file meets the infrequently-used file recognition condition, recognizing the file as an infrequently-used file.

15 Claims, 11 Drawing Sheets

(56) References Cited

FOREIGN PATENT DOCUMENTS

CN          104021160 A     9/2014
CN          105468416 A     4/2016

OTHER PUBLICATIONS

Machine Translation and Abstract of Chinese Publication No. CN102867041, Jan. 9, 2013, 17 pages.
Machine Translation and Abstract of Chinese Publication No. CN104021160, Sep. 3, 2014, 23 pages.
Machine Translation and Abstract of Chinese Publication No. CN105468416, Apr. 6, 2016, 26 pages.
Foreign Communication From a Counterpart Application, PCT Application No. PCT/CN2016/092079, English Translation of International Search Report dated May 4, 2017, 2 pages.

* cited by examiner

METHOD FOR RECOGNIZING INFREQUENTLY-USED DATA AND TERMINAL

CROSS-REFERENCE TO RELATED APPLICATIONS

This application is a U.S. National Stage Application of International Patent Application No. PCT/CN2016/092079, filed on Jul. 28, 2016, which is hereby in cooperated by reference in its entirety.

TECHNICAL FIELD

Embodiments of the present invention relate to the computer field, and in particular, to a method for recognizing infrequently-used data and a terminal.

BACKGROUND

After a mobile phone runs for a period of time, internal storage space of the mobile phone becomes less. Consequently, the mobile phone slows down over the time of use. In this case, trash files in the storage space need to be recognized and cleaned, to delete unneeded files. In a conventional solution, a mobile phone considers a cache file of an application program as a trash file. When storage space of the mobile phone is insufficient, the cache file of the application program is deleted. However, the conventional method for recognizing a trash file has the following problem: Cleanup of a frequently-used cache file causes a response time of an application program to increase and has an impact on use by a user. Moreover, in addition to the cache file, other trash files may exist in the mobile phone. Therefore, how to accurately recognize a trash file is a problem to be resolved urgently.

SUMMARY

A technical problem to be resolved by embodiments of the present invention is to provide a method for recognizing infrequently-used data and a terminal, so as to resolve a problem that a trash file is not recognized accurately in the prior art.

According to a first aspect, this application provides a method for recognizing infrequently-used data, including: first scanning, by a terminal, files in storage space according to a first scanning rule, and generating a file set according to the scanned files, where the file set includes the scanned files; determining all files in the file set, and for each file in the file set, obtaining a last access time of the file, where the last access time of the file indicates a last time at which a user accesses the file and the file is not modified, and the last access time of the file may be stored in an index node iNode of the file, where the iNode includes attribute information of the file, for example, a file size, the last access time of the file, a last modification time of the file, and a creation time of the file; recording a last access time of a file in an iNode is in a disabled state by default; in this application, the terminal may enable a function of recording a last access time of a file that meets a preset condition, for example, the terminal records a last access time of a file whose file size is greater than a preset value, so as to reduce processing overheads of a system; every time a file is accessed, the terminal updates a last access time of the file, where the access includes an operation of opening, browsing, previewing, executing, or the like; for example, when the user opens an audio file, the terminal updates a last access time of the audio file; when a file (for example, a picture file or a video file) provides a thumbnail preview function, when the user views a thumbnail, a last access time of the thumbnail is updated, but a last access time of an original file corresponding to the thumbnail is not updated, and the last access time of the original file is updated only when the user views the original file; the user opens a file (for example, a batch processing file, a command file, or an executable file) having an executing function, and the terminal updates a last access time of the file;

obtaining, by the terminal, a file attribute of the file, where the file attribute is used to describe a file attribute that has a discrete characteristic, for example, one or more of a type of the file, a type of an application program to which the file belongs, or a storage location of the file; querying an infrequently-used file recognition condition corresponding to the file attribute, where the infrequently-used file recognition condition is used to indicate a non-access duration threshold; and if the last access time of the file meets the infrequently-used file recognition condition, recognizing the file as an infrequently-used file, until all infrequently-used files in the file set are recognized.

In the foregoing embodiment, according to different file attributes, and by determining whether a last access time of a file meets a corresponding recognition condition, the file can be recognized as an infrequently-used file, and an infrequently-used trash file in the storage space can be recognized accurately.

With reference to the first aspect, in a first possible implementation, the file attribute is one or more of a type of the file or an application type of an application program to which the file belongs, and different file attributes correspond to different infrequently-used file recognition conditions.

In the foregoing embodiment, different infrequently-used file recognition conditions can be determined according to different file types and/or application types of application programs to which files belong, and infrequently-used trash files can be recognized accurately.

With reference to the second aspect or the first possible implementation of the second aspect, in a second possible implementation, the method further includes:

scanning, by the terminal, application programs in the storage space according to a second scanning rule, and generating a program set according to the scanned application programs; determining, by the terminal, all application programs in the program set, and for each application program in the program set, obtaining a last access time of the application program, where the last access time of the application program indicates a last time at which the application program switches to a foreground for running; obtaining an application attribute of the application program, where the application attribute indicates an attribute of a discrete characteristic of the application, for example, the application attribute includes one or more of an application type, a storage location of the application, whether the application can be uninstalled, or an application developer; querying an infrequently-used application recognition condition corresponding to the application attribute, where the infrequently-used application recognition condition includes a non-access duration threshold; and if the last access time of the application program meets the infrequently-used application recognition condition, recognizing the application program as an infrequently-used application, until all infrequently-used applications in the program set are recognized.

In the foregoing embodiment, according to different application attributes, and by determining whether a last access time of an application meets a corresponding infrequently-used application recognition condition, the application program can be recognized as an infrequently-used file, and an infrequently-used trash application in the storage space can be recognized accurately.

With reference to the second possible implementation of the first aspect, in a third possible implementation, the application attribute is an application type, and different application attributes correspond to different infrequently-used application recognition conditions.

In the foregoing embodiment, the terminal determines different infrequently-used application recognition conditions according to different application attributes, and accurately recognizes infrequently-used trash applications.

With reference to the second or the third possible implementation of the first aspect, in a fourth possible implementation, the method further includes:

generating an infrequently-used data set according to all infrequently-used files in the file set and all infrequently-used application programs in the program set, where the infrequently-used data set includes all recognized infrequently-used files and infrequently-used applications; obtaining m file impact values of all the infrequently-used files and n application impact values of all the infrequently-used applications in the infrequently-used data set, where m and n are integers greater than 0; the m file impact values are different from each other, and have m dimensions, and the file impact values are used to describe characteristic values of all the infrequently-used files in the infrequently-used data set, for example, the m file impact values are a file quantity, an occupied storage size, a percentage of remaining space, a random read/write performance degradation rate, and the like;

obtaining a total impact value after performing weighted summation on the m file impact values and the n application impact values; and if the total impact value is greater than a total impact threshold, and a specified impact value in the m file impact values and the n application impact values is greater than a corresponding impact threshold, displaying a cleanup prompt message; or if the total impact value is greater than a total impact threshold, displaying a cleanup prompt message; or if a specified impact value in the m file impact values and the n application impact values is greater than a corresponding impact threshold, displaying a cleanup prompt message.

In the foregoing embodiment, when resources occupied by the infrequently-used files and application programs affect running of the terminal, the user is prompted to clean infrequently-used trash files and trash applications. This prevents a running speed from being lower, and avoids frequent cleanup actions. Therefore, power of the terminal can be saved effectively.

With reference to the fourth possible implementation of the first aspect, in a fifth possible implementation, the m file impact values include one or more of a file quantity, a file size, storage space usage, or a file read/write performance degradation rate; and the n application impact values include one or more of an application quantity, an application size, or storage space usage.

With reference to the fourth or the fifth possible implementation of the first aspect, in a sixth possible implementation, the method further includes:

receiving a trigger instruction generated according to the cleanup prompt message, and classifying the files and the application programs in the infrequently-used data set according to a preset classification rule; for example, performing classification according to a quantity type, for example, classifying infrequently-used files into one type, and classifying infrequently-used applications into another type; or performing classification according to application programs to which infrequently-used files belong, and then classifying infrequently-used applications into one type; or performing classification according to file types of infrequently-used files, and then classifying infrequently-used applications into one type; or performing classification according to another manner; displaying the classified infrequently-used files and infrequently-used applications to the user; receiving an instruction for selecting a to-be-cleaned object in the infrequently-used data set, where the to-be-cleaned object may be a file or an application program, or include both a file and an application program, and determining, by the terminal, the to-be-cleaned object selected by the selection instruction, where the selection instruction may be a touch instruction, a keystroke instruction, a voice control instruction, or an instruction in another form; and receiving an instruction for deleting the selected to-be-cleaned object file and/or application program, and deleting the selected to-be-cleaned object. In the foregoing embodiment, recognized infrequently-used files and application programs are deleted according to the selection and deletion instructions of the user. This reduces consumption of the storage space and resources of the terminal, and prevents the terminal from being slower.

With reference to any one of the first aspect to the sixth possible implementation of the first aspect, in a seventh possible implementation, the scanning files and application programs in storage space according to a preset rule, and generating a file set according to the scanned files and application programs includes:

periodically scanning files whose file sizes are greater than a preset value and non-preinstalled application programs in the storage space, and generating a file set according to the scanned application programs; or receiving an input scanning instruction, scanning files and application programs in the storage space according to one or more of a specified directory, a specified file type, or a specified application type, and generating a file set according to the scanned files and application programs.

In the foregoing embodiment, to-be-recognized files and/or application programs are scanned pertinently according to different scanning policies. This prevents important files in the terminal from being deleted.

With reference to the first aspect or the first possible implementation of the first aspect, in an eighth possible implementation, the method further includes: obtaining, by the terminal, p file impact values of all infrequently-used files in the file set, where p is an integer greater than 0, and a relationship between each of the p file impact values and a health level of the terminal is: if the file impact value is greater, the health level of the terminal is lower, and a running speed of the terminal is lower; obtaining a total impact value after performing weighted summation on the p file impact values; and if the total impact value is greater than a total impact threshold, and a specified impact value in the p file impact values is greater than a corresponding impact threshold, displaying a cleanup prompt message; or if the total impact value is greater than a total impact threshold, displaying a cleanup prompt message; or if a specified impact value in the p file impact values is greater than a corresponding impact threshold, displaying a cleanup prompt message.

In the foregoing embodiment, the terminal determines, according to a comparison between the total impact value obtained through calculation and the total impact threshold, whether to clean infrequently-used files. This prevents the terminal from becoming slower in a running process, and can also prevent an increase of processing overheads of the terminal caused by frequent cleanup.

With reference to the eighth possible implementation of the first aspect, in a ninth possible implementation, the method further includes: receiving, by the terminal, a trigger instruction generated according to the cleanup prompt message, and classifying all the infrequently-used files in the file set according to a preset classification rule; receiving, by the terminal, an instruction for selecting all the infrequently-used files, and determining at least one infrequently-used file selected by the selection instruction; and receiving, by the terminal, an instruction for deleting the at least one infrequently-used file, and deleting the at least one infrequently-used file.

In the foregoing embodiment, the infrequently-used file is deleted according to the selection of the user, and a customized deletion service is provided.

With reference to any one of the second possible implementation of the first aspect to the tenth possible implementation of the first aspect, in a tenth possible implementation, obtaining the application type of the application program includes:

obtaining the application type of the application program from an application store; or obtaining the application type of the application program according to a package name of the application program; where the application type indicates a type defined according to a main function of the application program of the user, for example, the application type includes a navigation type, a chat type, a text processing type, or a picture processing type; application programs in the application store are classified in advance according to application types, and the terminal can obtain the application types of the application programs from the application store, or when the terminal downloads an installation package of an application program from the application store, a package name of the installation package carries an application type of the application program, and the terminal can obtain the application type of the application program according to the package name.

According to a second aspect, an embodiment of the present invention provides a terminal, including a first scanning module, a first obtaining module, a first querying module, and a first recognition module, where the first scanning module is configured to scan files in storage space according to a first scanning rule, and generate a file set according to the scanned files;

the first obtaining module is configured to: for each file in the file set, obtain a last access time of the file, where the last access time indicates a last time at which a user accesses the file and the file is not modified;

the first querying module is configured to obtain a file attribute of the file, and query an infrequently-used file recognition condition corresponding to the file attribute; and the first recognition module is configured to recognize the file as an infrequently-used file if the last access time of the file meets the infrequently-used file recognition condition.

With reference to the second aspect, in a first possible implementation, the file attribute is one or more of a type of the file or an application type of an application program to which the file belongs, and different file attributes correspond to different infrequently-used file recognition conditions.

With reference to the second aspect or the first possible implementation of the second aspect, in a second possible implementation, the terminal further includes:

a second scanning module, configured to scan application programs in the storage space according to a second scanning rule, and generate a program set according to the scanned application programs;

a second obtaining module, configured to: for each application program in the program set, obtain a last access time of the application program;

a second querying module, configured to obtain an application attribute of the application program, and query an infrequently-used application recognition condition corresponding to the application attribute; and a second recognition module, configured to recognize the application program as an infrequently-used application if the last access time of the application program meets the infrequently-used application recognition condition, where the last access time of the application program is a last time at which the application program switches to a foreground for running.

With reference to the second possible implementation of the second aspect, in a third possible implementation, the application attribute is an application type, and different application attributes correspond to different infrequently-used application recognition conditions.

With reference to the second or the third possible implementation of the second aspect, in a fourth possible implementation, the terminal further includes:

a generation module, configured to generate an infrequently-used data set according to all infrequently-used files in the file set and all infrequently-used application programs in the program set;

a first screening module, configured to obtain m file impact values of all the infrequently-used files and n application impact values of all the infrequently-used applications in the infrequently-used data set, where m and n are integers greater than 0;

a summation module, configured to obtain a total impact value after performing weighted summation on the m file impact values and the n application impact values; and a first display module, configured to: if the total impact value is greater than a total impact threshold, and a specified impact value in the m file impact values and the n application impact values is greater than a corresponding impact threshold, display a cleanup prompt message; or if the total impact value is greater than a total impact threshold, display a cleanup prompt message; or if a specified impact value in the m file impact values and the n application impact values is greater than a corresponding impact threshold, display a cleanup prompt message.

With reference to the fourth possible implementation of the second aspect, in a fifth possible implementation, the m file impact values include one or more of a file quantity, a file size, storage space usage, or a file read/write performance degradation rate; and the n application impact values include one or more of an application quantity, an application size, or storage space usage.

With reference to the fourth or the fifth possible implementation of the second aspect, in a sixth possible implementation, the terminal further includes:

a first classification module, configured to receive a trigger instruction generated according to the cleanup prompt message, and classify the files and the application programs in the infrequently-used data set according to a preset classification rule;

a first determining module, configured to receive an instruction for selecting the infrequently-used data set, and determine a to-be-cleaned object selected by the selection instruction, where the to-be-cleaned object is one or more of the files or the application programs; and a first deletion module, configured to receive an instruction for deleting the to-be-cleaned object, and delete the to-be-cleaned object.

With reference to any one of the second aspect to the sixth possible implementation of the second aspect, in a seventh possible implementation, the first scanning module is configured to:

periodically scan files whose file sizes are greater than a preset value in the storage space, and generate a file set according to the scanned files; or receive an input scanning instruction, scan files in the storage space according to one or more of a specified directory or a specified file type, and generate a file set according to the scanned files.

With reference to the second aspect or the first possible implementation of the second aspect, in an eighth possible implementation, the terminal further includes:

a second screening module, configured to obtain p file impact values of all infrequently-used files in the file set;

a second summation module, configured to obtain a total impact value after performing weighted summation on the p file impact values; and a second display module, configured to: if the total impact value is greater than a total impact threshold, and a specified impact value in the p file impact values is greater than a corresponding impact threshold, display a cleanup prompt message; or if the total impact value is greater than a total impact threshold, display a cleanup prompt message; or if a specified impact value in the p file impact values is greater than a corresponding impact threshold, display a cleanup prompt message.

With reference to the eighth possible implementation of the second aspect, in a ninth possible implementation, the terminal further includes:

a second classification module, configured to receive a trigger instruction generated according to the cleanup prompt message, and classify all the infrequently-used files in the file set according to a preset classification rule;

a second determining module, configured to receive an instruction for selecting the infrequently-used files, and determine at least one infrequently-used file selected by the selection instruction; and a second deletion module, configured to receive an instruction for deleting the at least one infrequently-used file, and delete the at least one infrequently-used file.

According to a third aspect, this application provides a terminal, including:

one or more processors, a memory, a bus system, a transceiver, and one or more programs, where the processor, the memory, and the transceiver are connected by the bus system, where the one or more programs are stored in the memory, the one or more programs include an instruction, and when the instruction is executed by the terminal, the terminal performs the method according to any one of the first aspect to the ninth possible implementation of the first aspect.

According to a fourth aspect, this application provides a computer readable storage medium storing one or more programs, where the one or more programs include an instruction, and when the instruction is executed by a terminal, the terminal performs the method according to any one of the first aspect to the ninth possible implementation of the first aspect.

Implementations of the present invention have the following beneficial effects:

A terminal scans files in storage space, and for the scanned files, queries an infrequently-used file recognition condition corresponding to each file attribute, and recognizes an infrequently-used file according to a last access time of each file and a corresponding infrequently-used file recognition condition. In this way, files that are not accessed for a long time in the storage space can be distinguished and recognized accurately according to characteristics of different files, and efficiency of recognizing infrequently-used files is improved.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that the terms used in the embodiments of the present invention are for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. In addition, in the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiment 1

Figure 1:
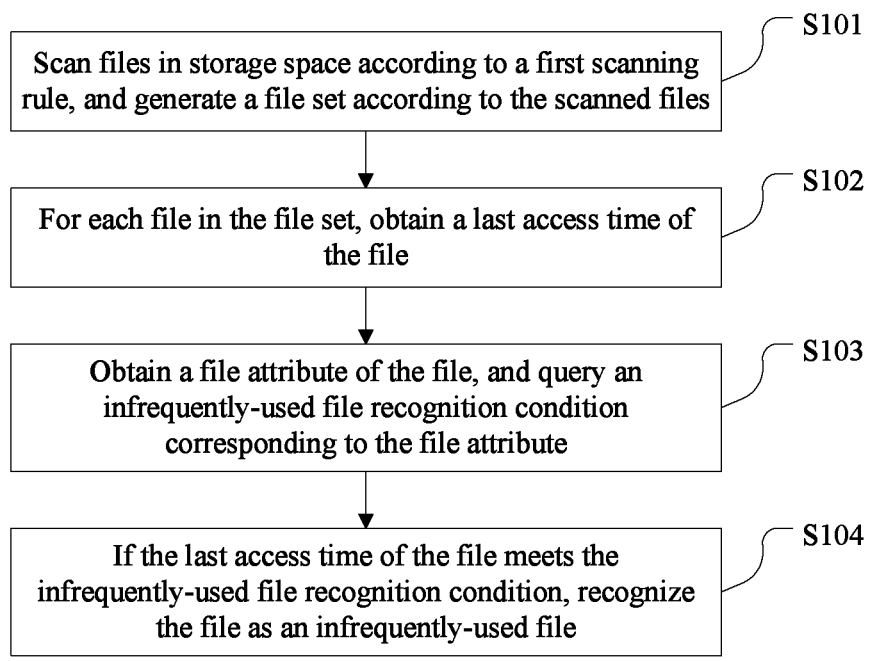
FIG. 1 is a schematic flowchart of a method for recognizing infrequently-used data according to an embodiment of the present invention.

Referring to FIG. 1, this embodiment of the present invention provides a method for recognizing infrequently-used data. In this embodiment of the present invention, the method includes the following steps.

S101. Scan files in storage space according to a first scanning rule, and generate a file set according to the scanned files.

Specifically, the first scanning rule is defined by a user or is a default rule in a terminal. The first scanning rule may be used to specify a scanned object, a scanning position, a scanning time, or the like. For example, the first scanning rule is to scan files whose file sizes are greater than 1 MB in the storage space. For another example, the scanning rule is to scan files whose file types are logs in the storage space. The files are a set of data that uses a storage medium as a carrier. For example, the files include a picture file, a video file, an audio file, a text file, and the like. The storage space indicates space of a memory of the terminal. The memory may be an internal memory or an external memory of the terminal. The terminal scans the files in the storage space according to the first scanning rule, and generates the file set according to the scanned files. The terminal may perform scanning according to a preset period, for example, perform scanning once every day; or may perform scanning after receiving a scanning instruction of the user. This is not limited in the present invention.

S102. For each file in the file set, obtain a last access time of the file.

Specifically, the last access time of the file indicates a last time at which the user accesses the file and the file is not modified. The last access time of the file may be stored in an index node iNode. The iNode is a data structure of a structure. The iNode stores attribute information of the file, for example, a file size, the last access time of the file, a last modification time of the file, and a creation time of the file. The last modification time of the file is not recorded in the iNode by the terminal by default. In this application, the terminal records only a last access time of a file that meets a preset condition, and stores the last access time in an iNode of the file. For example, the terminal records a last access time of a file whose file size is greater than a preset value. Every time a file is accessed and not modified, the terminal updates a last access time of the file. The access includes an operation of opening, browsing, previewing, executing, or the like. For example, when the user opens an audio file, the terminal updates a last access time of the audio file according to an opening time of the audio file. When a file (for example, a picture file or a video file) provides a thumbnail preview function, when the user views a thumbnail, the terminal updates a last access time of the thumbnail, but a last access time of an original file corresponding to the thumbnail is not updated, and the last access time of the original file is updated only when the user views the original file. For example, a gallery includes four picture files. When the user opens the gallery, the terminal displays thumbnails of the four picture files, and the terminal updates last access times of the four thumbnails. Only when the user accesses and opens an original picture corresponding to a thumbnail 1 can the terminal update a last access time of the original picture.

Using a terminal with an Android system as an example, a process of recording and obtaining a last access time of a file is as follows:

The Android system includes an app layer, a framework layer, and a kernel layer.

Kernel layer: After a file on a physical device (Physical Device) is accessed, a device driver (Device Drivers) caches a last access time of the file in a buffer cache, and a virtual file system (Virtual File System) obtains the last access time of the file from different file systems such as an EXT4 (Fourth extended filesystem, fourth-generation extended file system, EXT4 for short), or a FAT (File Allocation Table, file allocation table). The framework layer invokes the last access time by using an interface.

Framework layer: It reads the last access time of the file in the file system at the kernel layer by using an interface.

App layer: A file analysis interface (file Analysis Interface) invokes an interface (libcore) of the framework layer for obtaining the last access time, and the last access time of the file is reported to the user by using an automatic reporting interface (AutoCLeanService Report).

S103. Obtain a file attribute of the file, and query an infrequently-used file recognition condition corresponding to the file attribute.

Specifically, the attribute of the file is used to indicate characteristics related to the file, and is generally a discrete variable. For example, the attribute of the file includes one or more of a type of the file, a file storage location, or an application type to which the file belongs. The terminal may obtain a mapping table of mapping relationships between file attributes and infrequently-used file recognition conditions. In the mapping table, files having a same file attribute may correspond to a same infrequently-used file recognition condition, and files having different file attributes may correspond to different infrequently-used file recognition conditions. The mapping relationships may be stored on the terminal, or may be stored on a network server. The server updates the mapping table periodically according to statistical analysis of big data, so that the mapping table of the terminal keeps consistent with the mapping table of the server.

S104. If the last access time of the file meets the infrequently-used file recognition condition, recognize the file as an infrequently-used file.

Specifically, for each file in the file set, the terminal obtains the last access time of the file, obtains the file attribute of the file, queries the infrequently-used file recognition condition corresponding to the file attribute, determines whether the file meets the found infrequently-used file recognition condition, and if the file meets the infrequently-used file recognition condition, recognizes the file as an infrequently-used file. All the infrequently-used files in the file set are recognized according to the foregoing recognition method. The infrequently-used file recognition condition may be that non-access duration exceeds a duration threshold. The terminal determines whether duration between the last access time of the file and a current time exceeds the corresponding duration threshold. If yes, the file is an infrequently-used file. Otherwise, the file is a frequently-used file.

As can be learned from the foregoing embodiment, a terminal scans files in storage space, and for the scanned files, queries an infrequently-used file recognition condition corresponding to each file attribute, and recognizes an infrequently-used file according to a last access time of each file and a corresponding infrequently-used file recognition condition. In this way, files that are not accessed for a long time in the storage space can be distinguished and recognized accurately according to characteristics of different files, and efficiency of recognizing infrequently-used files is improved.

Embodiment 2

Figure 2A:
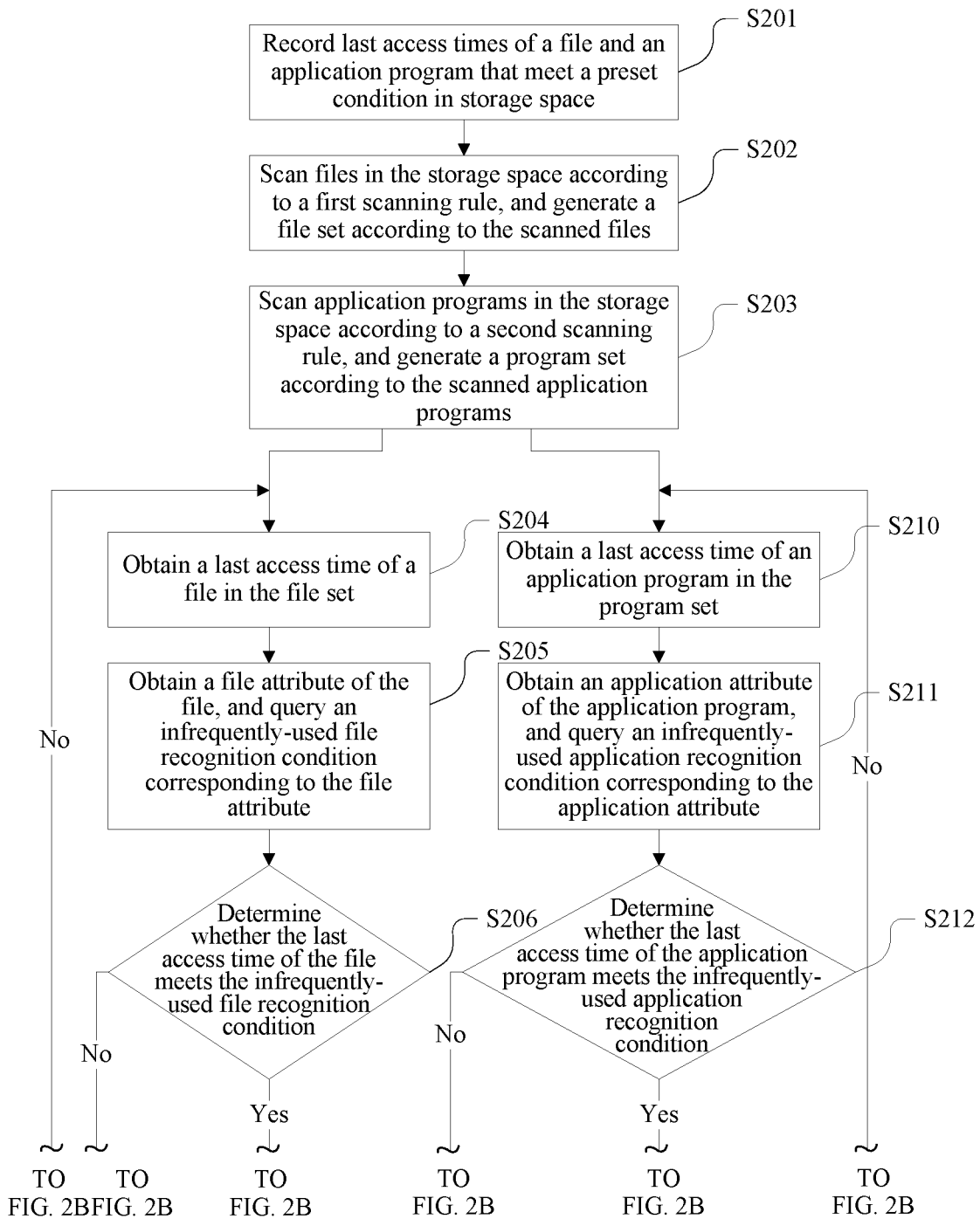
FIG. 2A and FIG. 2B are another schematic flowchart of a method for recognizing infrequently-used data according to an embodiment of the present invention.
Figure 2B:
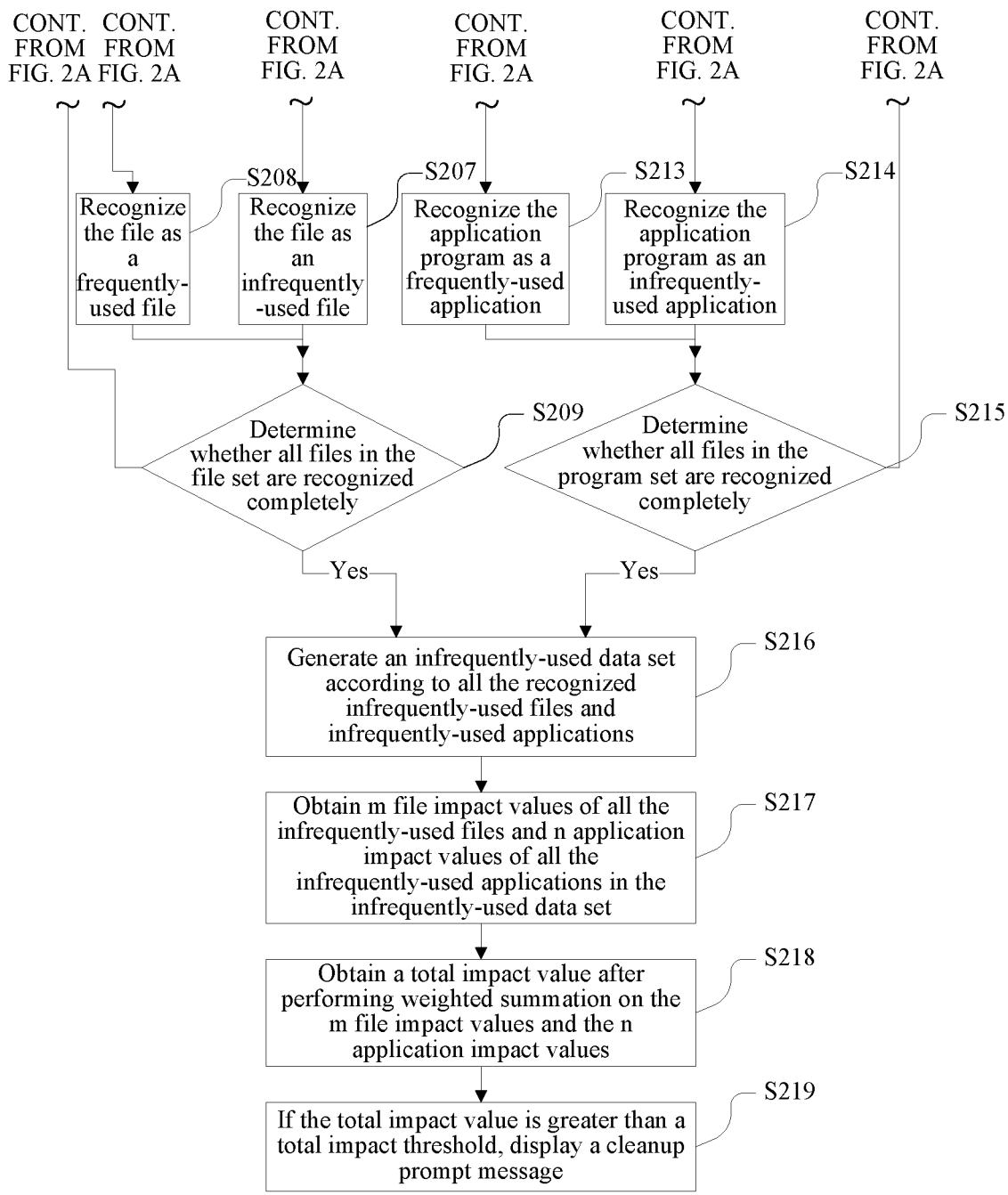

Referring to FIG. 2A and FIG. 2B, FIG. 2A and FIG. 2B are a schematic flowchart of a method for recognizing infrequently-used data according to this embodiment of the present invention. In this embodiment of the present invention, the method includes the following steps.

S201. Record last access times of a file and an application program that meet a preset condition in storage space.

Specifically, the last access time of the file indicates a last time at which a user accesses the file and the file is not modified, and the last access time of the application program indicates a last time at which the application program switches to a foreground for running. A terminal detects a running status of the application program, and when detecting that the application program switches to the foreground for running, records a current time, and updates the last access time of the application program by using the current time. Running on the foreground indicates a state when the application program displays a program interface. The terminal records the last access times of the file and the application program that meet the preset condition in the storage space. The storage space indicates space of an internal memory or an external memory of the terminal. For example, the terminal records a last access time of a file whose file size is greater than a preset value, and records a last access time of a non-preinstalled application program.

S202. Scan files in the storage space according to a first scanning rule, and generate a file set according to the scanned files.

Specifically, the terminal may scan files and application programs in the storage space periodically according to the first scanning rule. For example, the scanning rule may be that a file size is greater than a preset value. In some embodiments of this application, the scanning rule may also be one or more of a specified directory, a specified file type, or a specified application type. The scanning rule may be defined by the user or preconfigured in the terminal. This is not limited in the present invention. The terminal generates the file set according to the scanned files that meet the scanning rule. The file set includes the scanned files.

S203. Scan application programs in the storage space according to a second scanning rule, and generate a program set according to the scanned application programs.

Specifically, the second scanning rule is defined by the user or is a default rule in the terminal. The second scanning rule may be used to specify a scanned object, a scanning position, a scanning time, or the like. For example, the second scanning rule is an application program that can be uninstalled. For another example, the second scanning rule is to scan office application programs and scan chat application programs. The application program indicates software running in an operating system to achieve a specific objective. For example, the application program includes office software, multimedia software, database software, Internet network software, or the like. The terminal scans the application programs in the storage space according to the second scanning rule, and generates the program set according to the scanned application programs. The terminal performs scanning according to a preset period, for example, performs scanning once every day; or may perform scanning after receiving a scanning instruction of the user. This is not limited in the present invention.

S204. Obtain a last access time of a file in the file set.

Specifically, the terminal obtains all files in the file set, selects one of the files, and obtains a last access time of the file.

S205. Obtain a file attribute of the file, and query an infrequently-used file recognition condition corresponding to the file attribute.

Specifically, the file attribute of the file is obtained, and the infrequently-used file recognition condition corresponding to the file attribute is queried. In a possible implementation of the present invention, the file attribute is a file type. The terminal stores a mapping table of mapping relationships between file types and infrequently-used file recognition conditions. In the mapping table, a same file type corresponds to a same infrequently-used file recognition condition, and different file types may correspond to different infrequently-used file recognition conditions. The mapping table may be stored on the terminal or on a network server.

For example, the mapping relationships between the file types and the infrequently-used file recognition conditions in the mapping table are shown in Table 1.

TABLE 1

| File type | Infrequently-used file recognition condition |
|---|---|
| Compressed package file | Not accessed for more than a days |
| Video file | Not accessed for more than b days |
| Picture file | Not accessed for more than c days |
| Log file | Not accessed for more than d days |

In Table 1, a, b, c, and d indicate duration thresholds, and a duration threshold in an infrequently-used recognition condition corresponding to each file type in the mapping table may be set according to importance of a file. If the importance is higher, the duration threshold is greater. Assuming that importance of a log file is higher than that of a picture file, the duration threshold d may be set to be greater than the duration threshold c.

In another possible implementation of the present invention, the file attribute is an application type of an application program to which the file belongs. The terminal stores a mapping table of mapping relationships between application types and infrequently-used file recognition conditions. In the mapping table, a same application type has a same infrequently-used file recognition condition, and different application types may have different infrequently-used file recognition conditions. The file that belongs to the application program indicates a file located in an installation directory of the application program. For a file that does not belong to an application program in the storage space, an application program to which the file belongs is classified into another type in this application, or an infrequently-used file recognition condition corresponding to the file type is queried according to the file type of the file by referring to Table 1, or another processing manner is used. This is not limited in the present invention.

For example, the mapping relationships between the application types and the infrequently-used file recognition conditions in the mapping table are shown in Table 2.

TABLE 2

| Application type | Infrequently-used file recognition condition |
|---|---|
| Navigation type | Not accessed for more than e days |
| Chat type | Not accessed for more than f days |
| Office type | Not accessed for more than g days |
| Other types | Not accessed for more than h days |

In Table 2, e, f, g, and h indicate duration thresholds, and a duration threshold in an infrequently-used recognition condition corresponding to each application type in the mapping table may be set according to importance of an application program. If the importance is higher, the duration threshold is greater. Assuming that importance of a chat type is higher than that of a navigation type, the duration threshold f may be set to be greater than the duration threshold e.

In a possible embodiment of the present invention, the file attribute is a file type and an application type of an application program to which the file belongs. The terminal queries a corresponding infrequently-used file recognition condition according to two dimensions, that is, the file type and the application type. For a file that does not belong to any application program, an application type corresponding to the file is classified into another type in this application. The terminal obtains a mapping table of mapping relationships between file types and application types and infrequently-used file recognition conditions. The mapping table may be stored on the terminal or the network server.

For example, the mapping relationships between the file types and the application types and the infrequently-used file recognition conditions in the mapping table are shown in Table 3.

TABLE 3

| Application type | File type | Infrequently-used file recognition condition |
|---|---|---|
| Navigation | Compressed package file | Not accessed for more than i days |
|  | Picture file | Not accessed for more than j days |
| type | Log file | Not accessed for more than k days |
| Chat type | Compressed package file | Not accessed for more than l days |
|  | Picture file | Not accessed for more than m days |
|  | Log file | Not accessed for more than n days |
| Other types | Compressed package file | Not accessed for more than o days |
|  | Picture file | Not accessed for more than p days |
|  | Log file | Not accessed for more than q days |

In Table 3, i to q indicate duration thresholds. A duration threshold in each infrequently-used recognition condition in the mapping table may be set according to importance of an application program and a file type. If the importance is higher, the duration threshold is greater.

It should be noted that, the file attributes, the mapping relationships between the file attributes and the infrequently-used file recognition conditions, and the duration thresholds in the infrequently-used recognition conditions are described only as examples. A specific implementation is not limited to the foregoing examples.

S206. Determine whether the last access time of the file meets the infrequently-used file recognition condition.

Specifically, the terminal determines duration between the last access time and the current time, determines whether the duration meets the corresponding infrequently-used file recognition condition, and if yes, performs S207, or if no, performs S208.

Continued from the foregoing example, assuming that the last access time of the file is 18:03 on May 20, 2016 and that the current time is 9:05 on Jun. 20, 2016, the infrequently-used recognition condition corresponding to the file attribute of the file is: not accessed for more than 10 days. In this case, the terminal determines that the corresponding infrequently-used file recognition condition is met, and performs S207.

S207. Recognize the file as an infrequently-used file.

S208. Recognize the file as a frequently-used file.

S209. Determine whether all files in the file set are recognized completely.

Specifically, the terminal traverses the files in the file set by using the method in S204 to S208 until all the files are recognized completely. Then the infrequently-used file recognition procedure is terminated, and S216 is performed. Otherwise, S204 continues to be performed.

S210. Obtain a last access time of an application program in the program set.

Specifically, the terminal obtains a last access time of an application program in the program set. The last access time indicates a time at which the application program switches to the foreground for running.

S211. Obtain an application attribute of the application program, and query an infrequently-used application recognition condition corresponding to the application attribute.

Specifically, the application attribute may be an application type. The terminal obtains the application type of the application program, and queries the infrequently-used application recognition condition corresponding to the application type. The terminal stores a mapping table of mapping relationships between application types and infrequently-used application conditions. In the mapping table, a same application type corresponds to a same infrequently-used application recognition condition, and different application types may correspond to different infrequently-used application recognition conditions. The mapping table may be stored on the terminal or the network server. A method for obtaining an application type of an application program by the terminal may be: obtaining the application type by using an application store of the application program, or obtaining the application type according to a package name of the application program. For example, the mapping relationships between the application types and the infrequently-used application recognition conditions in the mapping table are shown in Table 4.

TABLE 4

| Application type | Infrequently-used application recognition condition |
|---|---|
| Navigation type | Not accessed for more than r days |
| Chat type | Not accessed for more than s days |
| Office type | Not accessed for more than t days |
| Audio or video type | Not accessed for more than u days |

In Table 4, r, s, t, and u indicate duration thresholds, and a duration threshold in an infrequently-used application recognition condition corresponding to each application type in the mapping table may be set according to importance of an application program. If the importance is higher, the duration threshold is greater. Assuming that importance of the chat type is higher than that of the navigation type, the duration threshold s may be set to be greater than the duration threshold r.

S212. Determine whether the last access time of the application program meets the infrequently-used application recognition condition.

Specifically, the terminal determines duration between the last access time of the application program and the current time, determines whether the duration meets the corresponding infrequently-used file recognition condition, and if yes, performs S214, or if no, performs S213.

S213. Recognize the application program as an infrequently-used application.

S214. Recognize the application program as a frequently-used application.

S215. Determine whether all files in the program set are recognized completely.

Specifically, the terminal traverses application programs in the program set by using the method in steps S210 to S215 until all the application programs are recognized completely. Then the infrequently-used application recognition procedure is terminated, and S216 is performed. Otherwise, S210 continues to be performed.

S216. Generate an infrequently-used data set according to all the recognized infrequently-used files and infrequently-used applications.

Specifically, the terminal obtains all the infrequently-used files recognized from the file set, obtains all the infrequently-used applications recognized from the program set, and generates the infrequently-used data set.

S217. Obtain m file impact values of all the infrequently-used files and n application impact values of all the infrequently-used applications in the infrequently-used data set.

Specifically, the file impact values indicate characteristic parameter values of all the infrequently-used files in the infrequently-used data set. The file impact values are generally consecutive variables. The application impact values indicate characteristic parameter values of all the application programs in the infrequently-used data set. The application impact values are generally consecutive variables. A relationship between each of the m file impact values and a health level of the terminal is: if the file impact value is greater, the terminal is less healthy, and running of the terminal is less smooth; if the file impact is smaller, the terminal is healthier, and running of the terminal is smoother. Likewise, a relationship between each of the n application impact values and the health level of the terminal is: if the application impact value is greater, the terminal is less healthy, and running of the terminal is less smooth; if the application impact is smaller, the terminal is healthier, and running of the terminal is smoother. The m application impact values may be one or more of a file quantity, a file size, storage space usage, or a random read/write performance degradation rate; and the n application impact values may be one or more of an application quantity, an application size, storage space usage, CPU usage, or memory usage.

S218. Obtain a total impact value after performing weighted summation on the m file impact values and the n application impact values.

Specifically, the terminal configures a weight for each parameter value in the m file impact values and the n application impact values. The terminal obtains the total impact value after performing weighted summation according to the weight.

For example, m=4, and n=4. The terminal obtains four file impact values and four application impact values and a weight of each parameter value, as shown in Table 5.

TABLE 5

| | | Parameter value | Weight | Parameter threshold |
|---|---|---|---|---|
| File | File quantity | N | Q1 | U1 |
| | File size | M bytes | Q2 | U2 |
| | Storage space usage | X | Q3 | U3 |
| | Random read/write performance degradation rate | Y | Q4 | U4 |
| Application | Application quantity | A | Q5 | U5 |
| | Application size | B bytes | Q6 | U6 |
| | CPU usage | C | Q7 | U7 |
| | Memory usage | D | Q8 | U8 |

According to each parameter value and the corresponding weight in Table 5, the terminal calculates a total impact value. The total impact value is: $S=N*Q1+M*Q2+X*Q3+Y*Q4+A*Q5+B*Q6+C*Q7+D*Q8$.

It should be noted that, types of the file impact values and the application impact values are not limited to the example shown in Table 5, and may be set according to a requirement.

S219. If the total impact value is greater than a total impact threshold, display a cleanup prompt message.

Specifically, the terminal determines whether the total impact value S obtained through calculation in S218 is greater than the total impact threshold U. If a determining result is yes, it indicates that the infrequently-used files and the infrequently-used applications in the terminal already have a severe impact on the running status. The terminal displays the cleanup prompt message, and the cleanup prompt message is used to prompt the user to clean the infrequently-used files and the infrequently-used applications in the terminal.

In a possible implementation of the present invention, the terminal sets a file impact threshold for each of the m file impact values, and sets an application impact threshold for each of the n application impact values. For example, as shown in Table 5, the file size corresponds to the impact threshold U2. When the terminal determines that a specified impact value in the m file impact values and the n application impact values is greater than a corresponding impact threshold, and that the total impact value is greater than the total impact threshold, the terminal displays the cleanup prompt message. The specified impact value may be one or more file impact values and/or application impact values. For example, specified impact values in Table 5 are: a file quantity N and CPU usage C. An impact threshold corresponding to the file quantity N is U1, and an impact threshold corresponding to the CPU usage C is U7. When determining that N is greater than U1, and that C is greater than U7, and that S is greater than U, the terminal displays the cleanup prompt message. Alternatively, when the terminal determines that the specified impact value in the m file impact values and the n application impact values is greater than the corresponding impact threshold, the terminal displays the cleanup prompt message.

Optionally, after the terminal displays the cleanup prompt message, the terminal receives a trigger instruction generated according to the cleanup prompt message, and classifies the files and the application programs in the infrequently-used data set according to a preset classification rule;

the terminal receives an instruction for selecting a to-be-cleaned object in the infrequently-used data set, and determines the to-be-cleaned object selected by the selection instruction; and the terminal receives an instruction for deleting the to-be-cleaned object, and deletes the selected to-be-cleaned object.

Specifically, when the terminal is a mobile terminal, the cleanup prompt message may be displayed on a notification bar. The terminal may classify the files and the application programs in the infrequently-used data set according to the preset classification rule when receiving a tap operation of the user on the cleanup prompt message, for example, perform classification according to the files and the application programs, or perform classification according to file sizes, applications, and files that belong to specified application programs. In addition, the terminal may display a size of storage space occupied by each type and sizes and percentages of storage space occupied by the files and application programs in the infrequently-used data set. The terminal may further display non-access duration of each file and each application program in the infrequently-used data set. The terminal receives an instruction for selecting a to-be-cleaned object in the infrequently-used data set. The to-be-cleaned object may be a file or an application program, or include both a file and an application program. The terminal determines the selected to-be-cleaned object. The terminal receives an instruction for deleting the selected to-be-cleaned object, and deletes the selected to-be-cleaned object.

Implementations of the present invention have the following beneficial effects:

A terminal scans files and application programs in storage space, and for the scanned files and application programs, queries an infrequently-used file recognition condition corresponding to each file attribute, queries an infrequently-used application recognition condition corresponding to each application program, recognizes an infrequently-used file according to a last access time of each file and a corresponding infrequently-used file recognition condition, and recognizes an infrequently-used application according to a last access time of each application and a corresponding infrequently-used application recognition condition. In this way, files and application programs that are not accessed for a long time in the storage space can be distinguished and recognized accurately according to characteristics of different files and application programs, and efficiency of recognizing infrequently-used data is improved.

Embodiment 3

Figure 3:
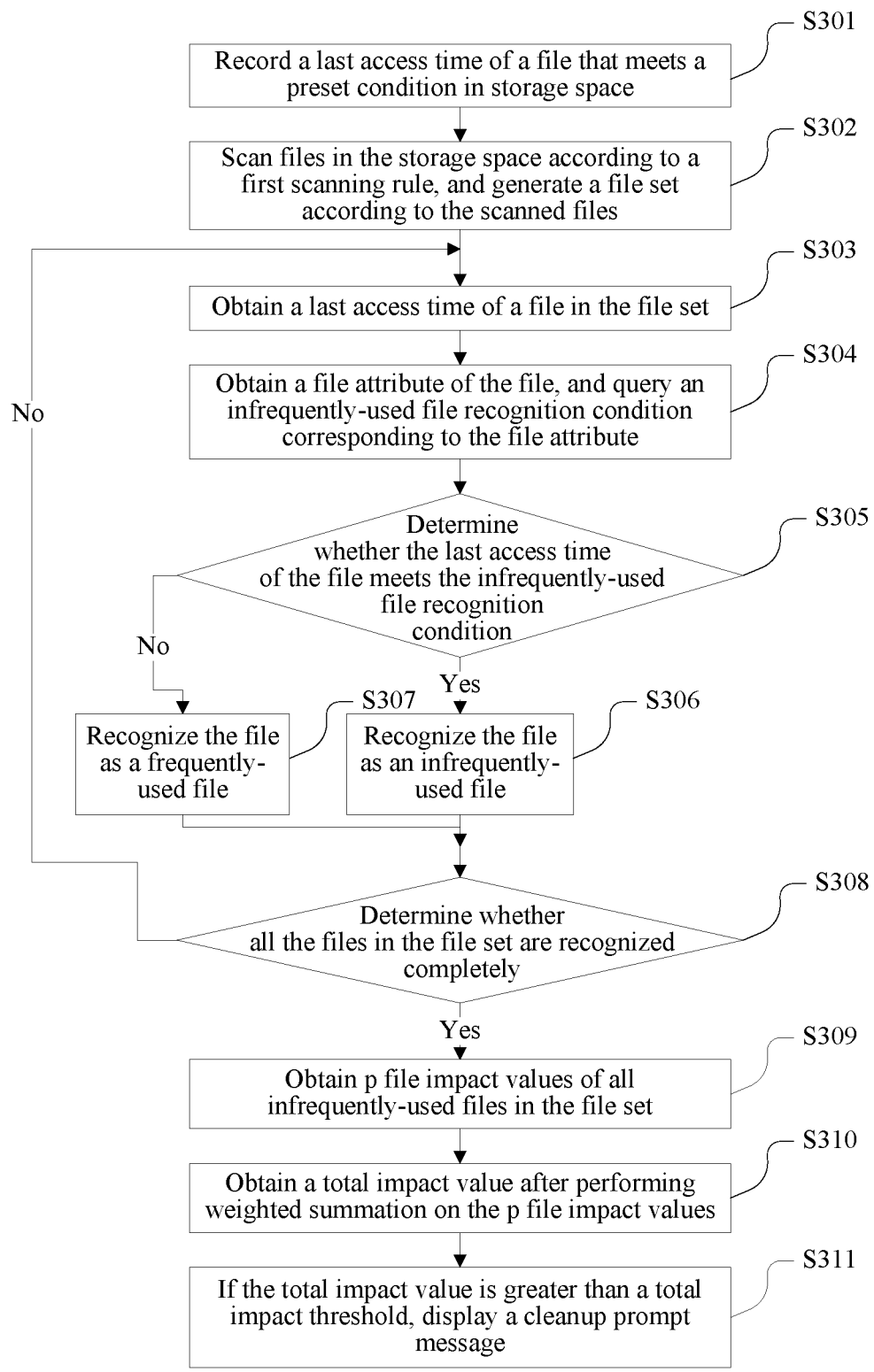
FIG. 3 is still another schematic flowchart of a method for recognizing infrequently-used data according to an embodiment of the present invention.

Referring to FIG. 3, FIG. 3 is still another schematic flowchart of a method for recognizing infrequently-used data according to this embodiment of the present invention. In this embodiment of the present invention, the method includes the following steps.

S301. Record a last access time of a file that meets a preset condition in storage space.

Specifically, the storage space is space of a memory. The memory may be an internal memory of a terminal, for example, an eMMC (embedded Multi Media Card, embedded multimedia card, eMMC for short), or an external memory, for example, an SD (Secure Digital Memory Card, secure digital memory card, SD for short). Because there are numerous files in the storage space, to reduce record overheads, the terminal records the file that meets the preset condition in the storage space. The preset condition may be set according to a requirement, and the file that meets the preset condition is generally a file that can be cleaned. For example, the preset condition is: a file size is greater than a preset value, or the file is neither an operating system file nor an internal file of an application program. The last access time of the file indicates a last time at which a user accesses the file and the file is not modified. The access may include opening, browsing, previewing, or executing. The terminal may store the recorded last time in an iNode of the file.

S302. Scan files in the storage space according to a first scanning rule, and generate a file set according to the scanned files.

Specifically, the terminal may scan the files and application programs in the storage space according to the first scanning rule periodically or when triggered by the user. For example, the scanning rule may be that a file size is greater than a preset value. In some embodiments of this application, the scanning rule may also be one or more of a specified directory, a specified file type, or a specified application type. The scanning rule may be defined by the user or preconfigured in the terminal. This is not limited in the present invention. The terminal generates the file set according to the scanned files that meet the first scanning rule. The file set includes the scanned files.

S303. Obtain a last access time of a file in the file set.

The terminal obtains a last access time of any file in the file set. The obtaining method may be obtaining the last access time of the file from an iNode of the file.

S304. Obtain a file attribute of the file, and query an infrequently-used file recognition condition corresponding to the file attribute.

Content of S304 is the same as that of S205. For details, refer to descriptions about S205. Details are not further described herein.

S305. Determine whether the last access time of the file meets the infrequently-used file recognition condition.

Content of S305 is the same as that of S206. For details, refer to descriptions about S206. Details are not further described herein.

S306. Recognize the file as an infrequently-used file.

S307. Recognize the file as a frequently-used file.

S308. Determine whether all the files in the file set are recognized completely.

Specifically, the terminal traverses the files in the file set by using the method in S303 to S307 until all the files are recognized completely. Then the infrequently-used file recognition procedure is terminated, and S309 is performed. Otherwise, S303 continues to be performed.

S309. Obtain p file impact values of all infrequently-used files in the file set.

Specifically, the file impact values indicate characteristic parameter values of all the infrequently-used files in the file set. The file impact values are generally consecutive variables. A relationship between each of the p file impact values and a health level of the terminal is: if the file impact value is greater, the terminal is less healthy, and running of the terminal is less smooth; if the file impact is smaller, the terminal is healthier, and running of the terminal is smoother. The p application impact values may be one or more of a file quantity, a file size, storage space usage, or a random read/write performance degradation rate.

S310. Obtain a total impact value after performing weighted summation on the p file impact values.

Specifically, the terminal configures a weight for each parameter value in the p file impact values. The terminal obtains the total impact value after performing weighted summation according to the weight.

For example, p=4. The terminal obtains four file impact values and a weight of each parameter value, as shown in Table 6.

TABLE 6

|  |  | Parameter value | Weight | Parameter threshold |
|---|---|---|---|---|
| File | File quantity | N | Q1 | U1 |
|  | File size | M bytes | Q2 | U2 |
|  | Storage space usage | X | Q3 | U3 |
|  | Random read/write performance degradation rate | Y | Q4 | U4 |

According to each parameter value and the corresponding weight in Table 6, the terminal calculates a total impact value. The total impact value is: S=N*Q1+M*Q2+X*Q3+Y*Q4.

It should be noted that, types of the file impact values are not limited to the example shown in Table 6, and may be set according to a requirement.

S311. If the total impact value is greater than a total impact threshold, display a cleanup prompt message.

Specifically, the terminal determines whether the total impact value S obtained through calculation in S310 is greater than the total impact threshold U. If a determining result is yes, it indicates that the infrequently-used files in the terminal already have a severe impact on a running status. The terminal displays the cleanup prompt message, and the cleanup prompt message is used to prompt the user to clean the infrequently-used files in the terminal.

In a possible implementation of the present invention, the terminal sets a file impact threshold for each of the p file impact values. For example, as shown in Table 6, the file size corresponds to the impact threshold U2. When the terminal determines that a specified impact value in the p file impact values is greater than a corresponding impact threshold, and that the total impact value is greater than the total impact threshold, the terminal displays the cleanup prompt message. The specified impact value may be one or more file impact values. For example, specified impact values in Table 6 are: a file quantity N and CPU usage C. An impact threshold corresponding to the file quantity N is U1, and an impact threshold corresponding to the CPU usage C is U7. When determining that N is greater than U1, and that C is greater than U7, and that S is greater than U, the terminal displays the cleanup prompt message.

In some embodiments of the present invention, if the terminal determines that a specified impact value in m file impact values is greater than a corresponding impact threshold, the terminal displays the cleanup prompt message.

Optionally, after the terminal displays the cleanup prompt message, the terminal receives a trigger instruction generated according to the cleanup prompt message, and classifies all the infrequently-used files in the file set according to a preset classification rule;

the terminal receives an instruction for selecting at least one infrequently-used file in all the infrequently-used files, and determines the at least one infrequently-used file selected by the selection instruction; and the terminal receives an instruction for deleting the at least one infrequently-used file, and deletes the selected at least one infrequently-used file.

Specifically, when the terminal is a mobile phone, the cleanup prompt message may be displayed on a notification bar. The terminal may classify all the infrequently-used files in the file set according to the preset classification rule when receiving a tap operation of the user on the cleanup prompt message, for example, perform classification according to file sizes and files that belong to specified application programs. In addition, the terminal may display a size of storage space occupied by each type and sizes and percentages of storage space occupied by the infrequently-used files. The terminal may further display non-access duration of each infrequently-used file. The terminal receives an instruction for selecting a to-be-cleaned object in the infrequently-used files. The terminal determines at least one infrequently-used file that is selected. The terminal receives an instruction for deleting the selected at least one infrequently-used file, and deletes the selected at least one infrequently-used file.

For example, referring to FIG. 4a to FIG. 4d, FIG. 4a to FIG. 4d are schematic diagrams of user interfaces on which a terminal cleans infrequently-used data. The terminal displays a cleanup prompt message "Data that is not used for a long time is found" on a notification bar, where the cleanup prompt message is used to prompt a user to clean the infrequently-used data. When the terminal receives a tap operation of the user on the cleanup prompt message, the terminal classifies files and application programs in an infrequently-used data set. Classification methods are: infrequently-used files (WeChat cleanup only) in a WeChat application program, infrequently-used files whose file formats are a video type (video cleanup only), large files whose file sizes are greater than a preset value, and infrequently-used applications. The terminal displays the user interface in FIG. 4b, and for each type, displays a size of storage space occupied by the type. For example, in WeChat cleanup only, a size of occupied storage space is 500 MB. The terminal may display detailed information about each file or application program of each type. For example, in FIG. 4c, the terminal displays a file size and non-access duration of each of large files. For example, in FIG. 4d, the terminal displays an application size and non-access duration of each of infrequently-used applications. The user may select a file and/or an application program to be cleaned in the infrequently-used data set. The terminal determines the file and/or application program selected by the user, and when receiving an instruction for deleting the selected file and/or application program, deletes the selected file and/or application program.

Figure 4A:
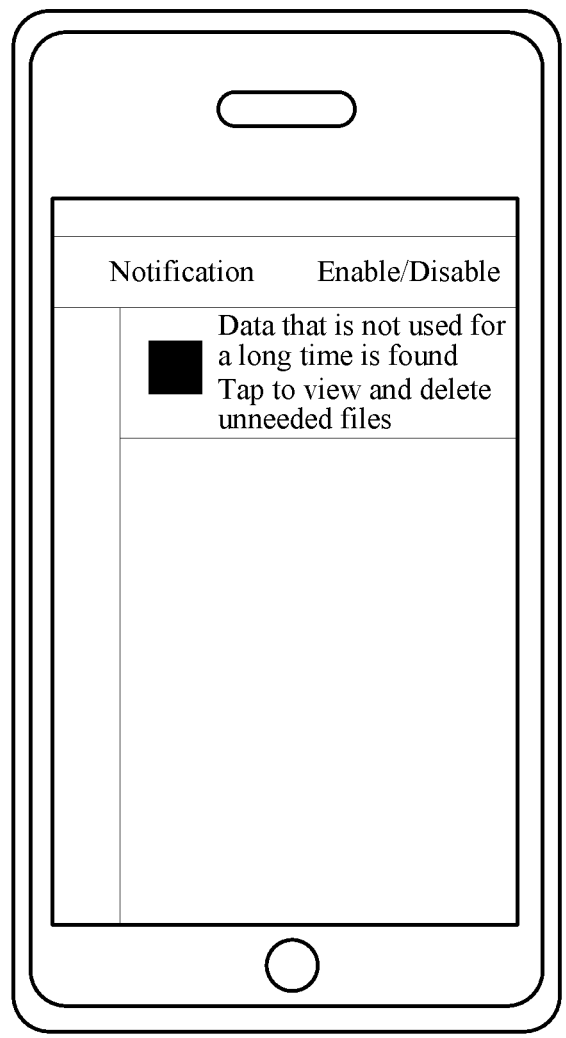
FIG. 4a to FIG. 4e are schematic diagrams of user interfaces of a terminal.
Figure 4B:
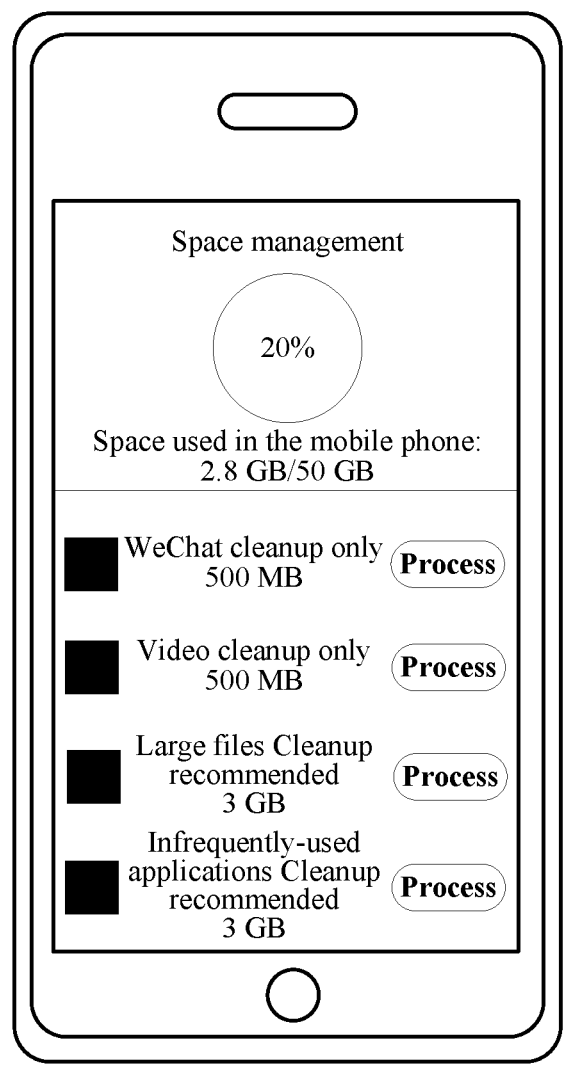
Figure 4C:
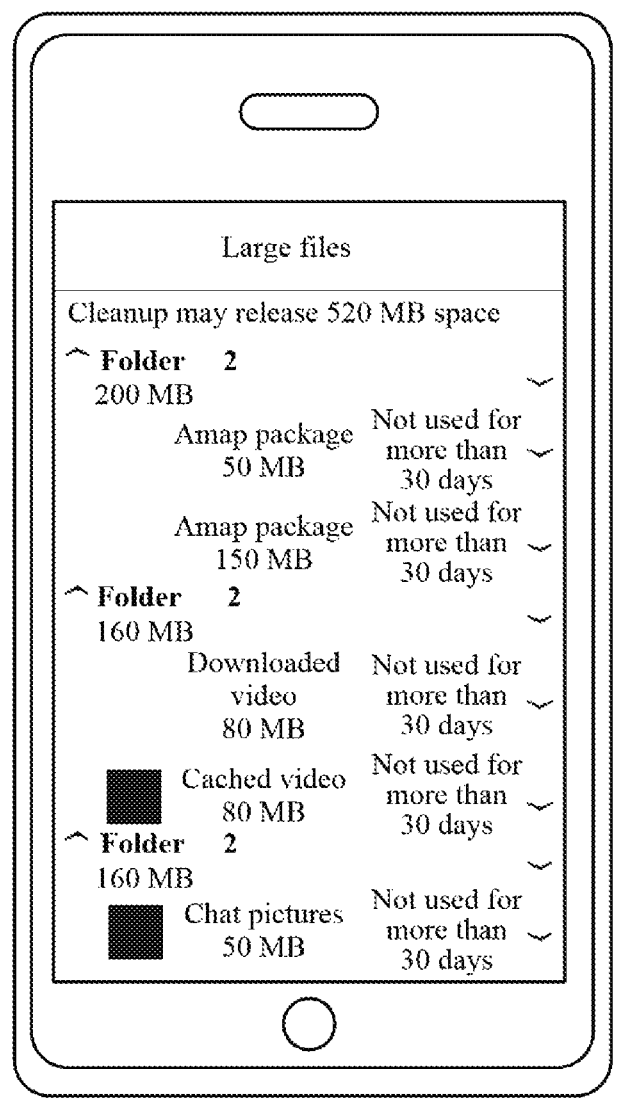
Figure 4D:
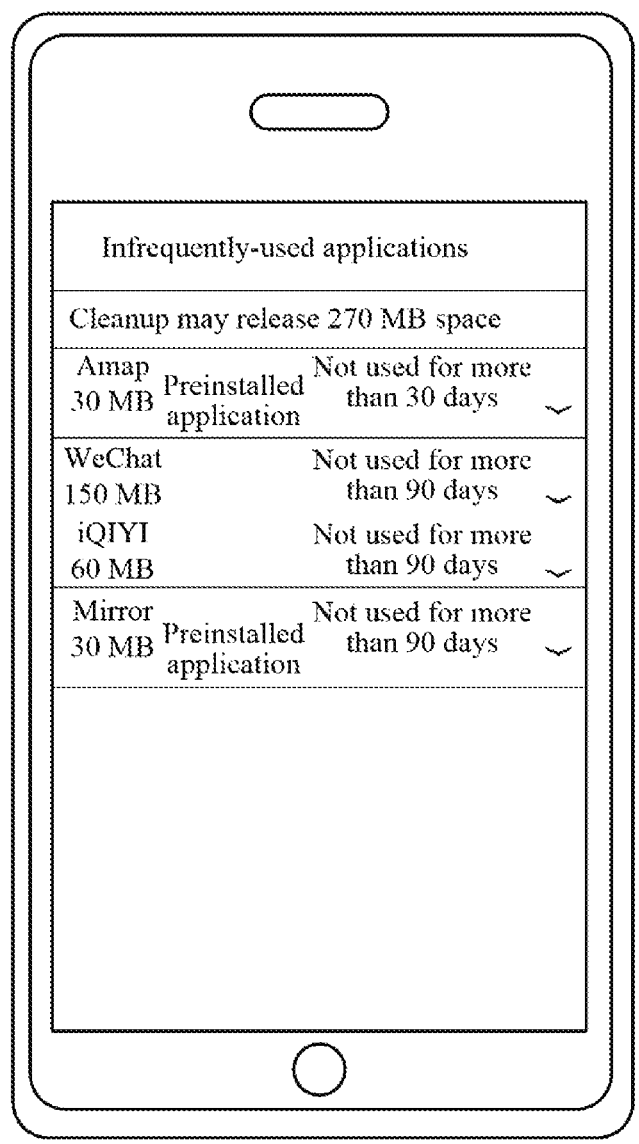
Figure 4E:
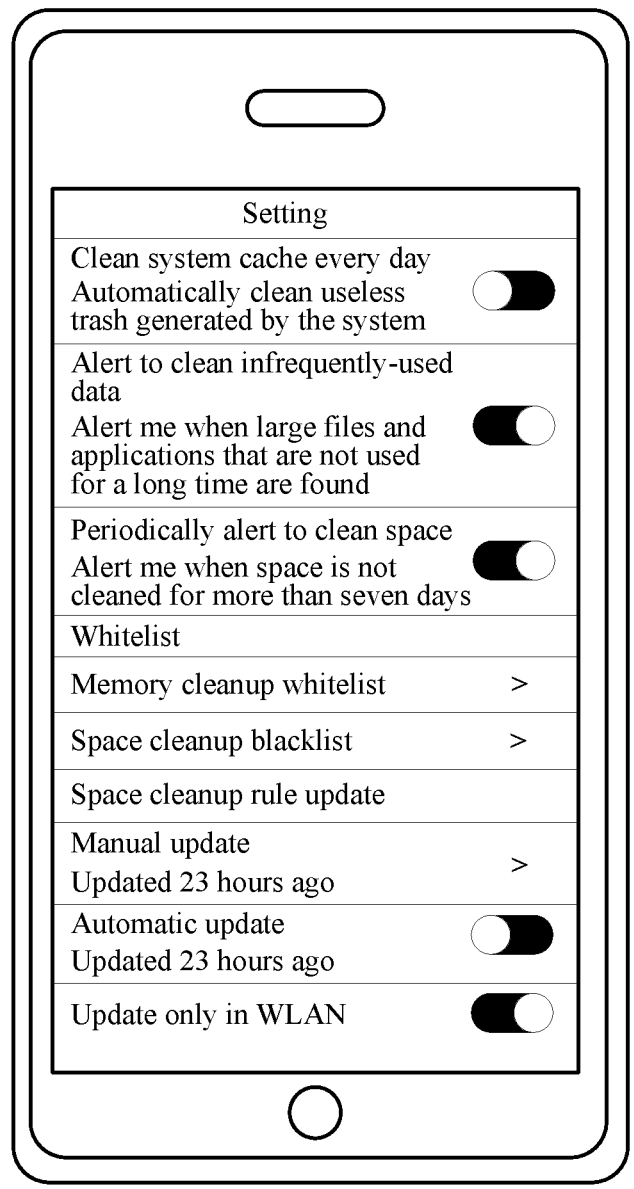

FIG. 4e is a user interface used for setting a scanning rule. The user may set a scanning period, an alerting condition, a space cleanup whitelist, a memory cleanup whitelist, or the like. The terminal scans the storage space according to the set scanning rule.

Embodiment 4

Figure 5:
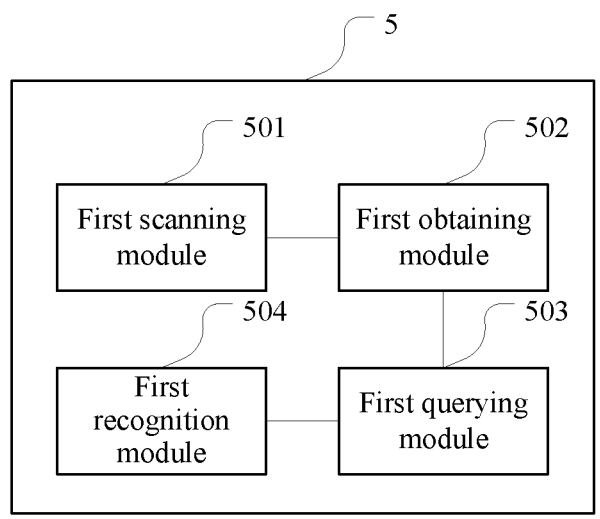
FIG. 5 is a schematic structural diagram of a terminal according to an embodiment of the present invention.

Referring to FIG. 5, FIG. 5 is a schematic structural diagram of a terminal according to this embodiment of the present invention. The terminal in this embodiment of the present invention is configured to perform the method for recognizing infrequently-used data in FIG. 1. For related terms and processes, refer to descriptions about the embodiments in FIG. 1 and FIG. 2A and FIG. 2B. A terminal 5 includes a first scanning module 501, a first obtaining module 502, a first querying module 503, and a first recognition module 504.

The first scanning module 501 is configured to scan files in storage space according to a first scanning rule, and generate a file set according to the scanned files.

The first obtaining module 502 is configured to: for each file in the file set, obtain a last access time of the file, where the last access time indicates a last time at which a user accesses the file and the file is not modified.

The first querying module 503 is configured to obtain a file attribute of the file, and query an infrequently-used file recognition condition corresponding to the file attribute.

The first recognition module 504 is configured to recognize the file as an infrequently-used file if the last access time of the file meets the infrequently-used file recognition condition.

Optionally, the file attribute is one or more of a type of the file or an application type of an application program to which the file belongs, and different file attributes correspond to different infrequently-used file recognition conditions.

Optionally, the terminal 5 further includes a second scanning module, a second obtaining module, a second querying module, and a second recognition module.

The second scanning module is configured to scan application programs in the storage space according to a second scanning rule, and generate a program set according to the scanned application programs.

The second obtaining module is configured to: for each application program in the program set, obtain a last access time of the application program.

The second querying module is configured to obtain an application attribute of the application program, and query an infrequently-used application recognition condition corresponding to the application attribute.

The second recognition module is configured to recognize the application program as an infrequently-used application if the last access time of the application program meets the infrequently-used application recognition condition, where the last access time of the application program is a last time at which the application program switches to a foreground for running.

Optionally, the application attribute is an application type, and different application attributes correspond to different infrequently-used application recognition conditions.

Optionally, the terminal 5 further includes a generation module, a first screening module, a first summation module, and a first display module.

The generation module is configured to generate an infrequently-used data set according to all infrequently-used files in the file set and all infrequently-used application programs in the program set.

The first screening module is configured to obtain m file impact values of all the infrequently-used files and n application impact values of all the infrequently-used applications in the infrequently-used data set, where m and n are integers greater than 0.

The first summation module is configured to obtain a total impact value after performing weighted summation on the m file impact values and the n application impact values.

The first display module is configured to: if the total impact value is greater than a total impact threshold, and a specified impact value in the m file impact values and the n application impact values is greater than a corresponding impact threshold, display a cleanup prompt message; or if the total impact value is greater than a total impact threshold, display a cleanup prompt message; or if a specified impact value in the m file impact values and the n application impact values is greater than a corresponding impact threshold, display a cleanup prompt message.

Optionally, the m file impact values include one or more of a file quantity, a file size, storage space usage, or a file read/write performance degradation rate; and the n application impact values include one or more of an application quantity, an application size, or storage space usage.

Optionally, the terminal further includes a first classification module, a first determining module, and a first deletion module.

The first classification module is configured to receive a trigger instruction generated according to the cleanup prompt message, and classify the files and the application programs in the infrequently-used data set according to a preset classification rule.

The first determining module is configured to receive an instruction for selecting the infrequently-used data set, and determine a to-be-cleaned object selected by the selection instruction, where the to-be-cleaned object is one or more of the files or the application programs.

The first deletion module is configured to receive an instruction for deleting the to-be-cleaned object, and delete the to-be-cleaned object.

Optionally, the first scanning module 501 is configured to:

periodically scan files whose file sizes are greater than a preset value in the storage space, and generate a file set according to the scanned files; or receive an input scanning instruction, scan files in the storage space according to one or more of a specified directory or a specified file type, and generate a file set according to the scanned files.

Optionally, the terminal 5 further includes a second screening module, a second summation module, and a second display module.

The second screening module is configured to obtain p file impact values of all infrequently-used files in the file set.

The second summation module is configured to obtain a total impact value after performing weighted summation on the p file impact values.

The second display module is configured to: if the total impact value is greater than a total impact threshold, and a specified impact value in the p file impact values is greater than a corresponding impact threshold, display a cleanup prompt message; or if the total impact value is greater than a total impact threshold, display a cleanup prompt message; or if a specified impact value in the p file impact values is greater than a corresponding impact threshold, display a cleanup prompt message.

Optionally, the terminal 5 further includes a second classification module, a second determining module, and a second deletion module.

The second classification module is configured to receive a trigger instruction generated according to the cleanup prompt message, and classify all the infrequently-used files in the file set according to a preset classification rule.

The second determining module is configured to receive an instruction for selecting the infrequently-used files, and determine at least one infrequently-used file selected by the selection instruction.

The second deletion module is configured to receive an instruction for deleting the at least one infrequently-used file, and delete the at least one infrequently-used file.

This embodiment of the present invention is based on a same idea as the method embodiments in FIG. 1 to FIG. 3 and has a same technical effect as the method embodiments. For a specific process, refer to the descriptions in the method embodiments in FIG. 1 to FIG. 3. Details are not further described herein.

Embodiment 5

Figure 6:
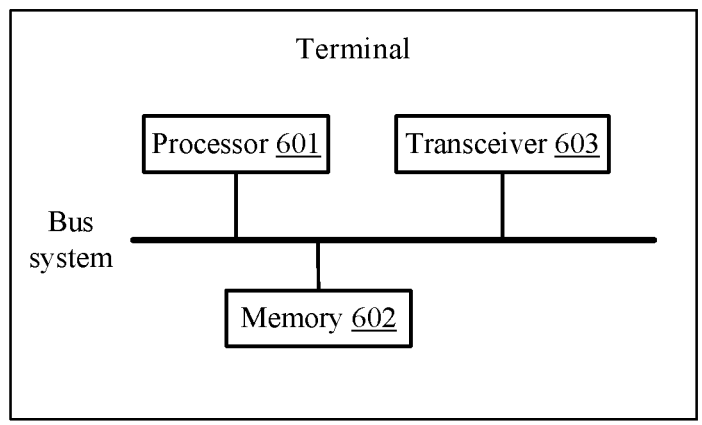
FIG. 6 is another schematic structural diagram of a terminal according to an embodiment of the present invention.

Referring to FIG. 6, FIG. 6 is a schematic structural diagram of a terminal according to this embodiment of the present invention. In this embodiment of the present invention, the terminal includes a processor 601, a memory 602, and a transceiver 603. A quantity of processors 601 in the terminal may be one or more. For example, the processor 601 is a multi-core main processor and a coprocessor. In some embodiments of the present invention, the processor 601, the memory 602, and the transceiver 603 may be connected by a bus system or in another manner.

The memory 602 stores program code. The processor 601 is configured to invoke the program code stored in the memory 602 to perform the following operations:

scanning files in storage space according to a first scanning rule, and generating a file set according to the scanned files;

for each file in the file set, obtaining a last access time of the file, where the last access time indicates a last time at which a user accesses the file and the file is not modified;

obtaining a file attribute of the file, and querying an infrequently-used file recognition condition corresponding to the file attribute; and if the last access time of the file meets the infrequently-used file recognition condition, recognizing the file as an infrequently-used file.

Optionally, the file attribute is one or more of a type of the file or an application type of an application program to which the file belongs, and different file attributes correspond to different infrequently-used file recognition conditions.

Optionally, the processor is further configured to perform the following:

scanning application programs in the storage space according to a second scanning rule, and generating a program set according to the scanned application programs;

for each application program in the program set, obtaining a last access time of the application program;

obtaining an application attribute of the application program, and querying an infrequently-used application recognition condition corresponding to the application attribute; and if the last access time of the application program meets the infrequently-used application recognition condition, recognizing the application program as an infrequently-used application, where the last access time of the application program is a last time at which the application program switches to a foreground for running.

Optionally, the application attribute is an application type, and different application attributes correspond to different infrequently-used application recognition conditions.

Optionally, the processor is further configured to perform the following:

generating an infrequently-used data set according to all infrequently-used files in the file set and all infrequently-used application programs in the program set;

obtaining m file impact values of all the infrequently-used files and n application impact values of all the infrequently-used applications in the infrequently-used data set, where m and n are integers greater than 0;

obtaining a total impact value after performing weighted summation on the m file impact values and the n application impact values; and if the total impact value is greater than a total impact threshold, and a specified impact value in the m file impact values and the n application impact values is greater than a corresponding impact threshold, displaying a cleanup prompt message; or if the total impact value is greater than a total impact threshold, displaying a cleanup prompt message; or if a specified impact value in the m file impact values and the n application impact values is greater than a corresponding impact threshold, displaying a cleanup prompt message.

Optionally, the m file impact values include one or more of a file quantity, a file size, storage space usage, or a file read/write performance degradation rate; and the n application impact values include one or more of an application quantity, an application size, or storage space usage.

Optionally, the processor is further configured to perform the following:

receiving a trigger instruction generated according to the cleanup prompt message, and classifying the files and the application programs in the infrequently-used data set according to a preset classification rule;

receiving an instruction for selecting the infrequently-used data set, and determining a to-be-cleaned object selected by the selection instruction, where the to-be-cleaned object is one or more of the files or the application programs; and receiving an instruction for deleting the to-be-cleaned object, and deleting the to-be-cleaned object.

Optionally, the scanning, by the processor, files in storage space according to a first, and generating a file set according to the scanned files includes:

periodically scanning files whose file sizes are greater than a preset value in the storage space, and generating a file set according to the scanned files; or receiving an input scanning instruction, scanning files in the storage space according to one or more of a specified directory or a specified file type, and generating a file set according to the scanned files.

Optionally, the processor is further configured to perform the following:

obtaining p file impact values of all infrequently-used files in the file set, where p is an integer greater than 0;

obtaining a total impact value after performing weighted summation on the m file impact values; and if the total impact value is greater than a total impact threshold, and a specified impact value in the p file impact values is greater than a corresponding impact threshold, displaying a cleanup prompt message; or if the total impact value is greater than a total impact threshold, displaying a cleanup prompt message; or if a specified impact value in the p file impact values is greater than a corresponding impact threshold, displaying a cleanup prompt message.

Optionally, the processor is further configured to perform the following:

receiving a trigger instruction generated according to the cleanup prompt message, and classifying all the infrequently-used files according to a preset classification rule;

receiving an instruction for selecting all the infrequently-used files, and determining at least one infrequently-used file selected by the selection instruction; and receiving an instruction for deleting the at least one infrequently-used file, and deleting the at least one infrequently-used file.

Optionally, obtaining, by the processor, the application type of the application program includes:

obtaining the application type of the application program from an application store; or obtaining the application type of the application program according to a package name of the application program.

This embodiment of the present invention is based on a same idea as the method embodiments 1 to 3 and has a same technical effect as the method embodiments. For a specific process, refer to the descriptions in the method embodiments 1 to 3. Details are not further described herein.

Embodiment 6

Figure 7:
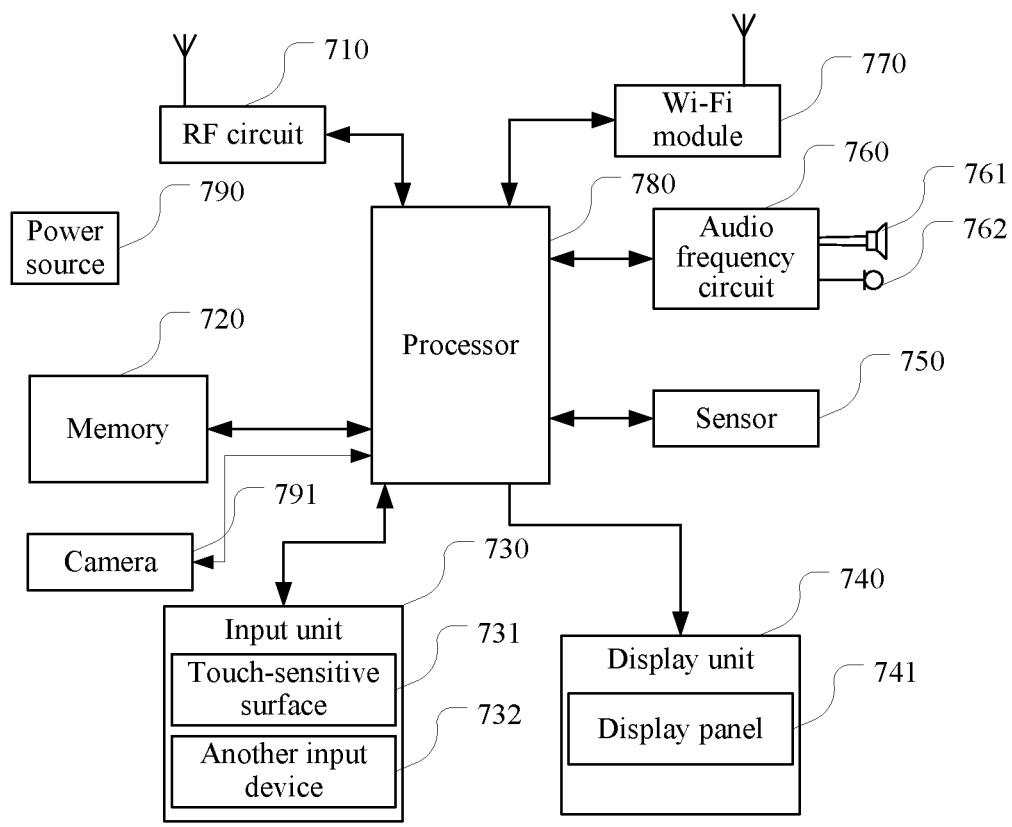
FIG. 7 is a schematic structural diagram of a mobile phone according to an embodiment of the present invention.

Referring to FIG. 7, FIG. 7 is a schematic structural diagram of a mobile phone having a touch-sensitive surface according to this embodiment of the present invention. The mobile phone may be configured to implement the method for recognizing infrequently-used data according to the foregoing embodiment. Specifically:

The mobile phone may include components such as an RF (Radio Frequency, radio frequency) circuit 710, a memory 720 including one or more than one computer readable storage medium, an input unit 730, a display unit 740, a sensor 750, an audio frequency circuit 760, a Wi-Fi (wireless fidelity, Wireless Fidelity) module 760, a processor 780 including one or more than one processing core, and a power source 790. A person skilled in the art may understand that, a structure of the mobile phone shown in FIG. 7 does not constitute a limitation on the mobile phone. A quantity of components included may be greater or less than that shown in the figure, or some components are combined, or component arrangements are different.

The RF circuit 710 may be configured to receive or transmit signals in an information reception or transmission process or a call process, and in particular, after receiving downlink information from a base station, transmit the downlink information to one or more than one processor 780 for processing, and in addition, transmit uplink data to the base station. Generally, the RF circuit 710 includes but is not limited to an antenna, at least one amplifier, a tuner, one or more oscillators, a subscriber identity module (SIM) card, a transceiver, a coupler, an LNA (Low Noise Amplifier, low noise amplifier), a duplexer, or the like. In addition, the RF circuit 710 may further communicate with a network and other devices through wireless communication. The wireless communication may use any communications standard or protocol, including but not limited to 3GPP (3rd Generation Partnership Project, 3rd Generation Partnership Project, 3GPP for short), 3GPP2 (3rd Generation Partnership Project 2, 3rd Generation Partnership Project 2, 3GPP2 for short), UMTS (Universal Mobile Telecommunications System, Universal Mobile Telecommunications System, UMTS for short), LTE (Long Term Evolution, Long Term Evolution, LTE for short), LTE-A (LTE-Advanced, LTE-Advanced, LTE-A for short), WIMAX (Worldwide Interoperability for Microwave Access, Worldwide Interoperability for Microwave Access, WIMAX for short), HSDPA (High Speed Downlink Packet Access, High Speed Downlink Packet Access, HSDPA for short), HSUPA (High Speed Uplink Packet Access, High Speed Uplink Packet Access, HSUPA for short), TDMA (Time Division Multiple Access, Time Division Multiple Access, TDMA for short), WCDMA (Wideband Code Division Multiple Access, Wideband Code Division Multiple Access, WCDMA for short), GSM (Global System for Mobile Communication, Global System for Mobile Communication, GSM for short), e-mail, SMS (Short Messaging Service, short message service), and the like.

The memory 720 may be configured to store a software program and module. The processor 780 executes various function applications and data processing by running the software program and module stored in the memory 720. The memory 720 may mainly include a program storage area and a data storage area. The program storage area may store an operating system, an application program required by at least one function (such as an audio playing function or an image playing function), or the like. The data storage area may store data (such as audio data or a phone book) that is created according to usage of the mobile phone, or the like. In addition, the memory 720 may include a high-speed random access memory, and may further include a non-volatile memory, for example, at least one magnetic disk storage, a flash memory, or another volatile solid state memory. Correspondingly, the memory 720 may further include a memory controller, so that the processor 780 and the input unit 730 can access the memory 720.

The input unit 730 may be configured to receive input digit or character information, and generate a signal input of a keyboard, a mouse, a joystick, light, or a track ball related to a user setting and function control. Specifically, the input unit 730 may include a touch-sensitive surface 731 and another input device 732. The touch-sensitive surface 731, also referred to as a touchscreen or a touch panel, may capture a touch operation of a user on or near the touch-sensitive surface (for example, an operation performed by the user by using any appropriate object or accessory such as a finger or a stylus on the touch-sensitive surface 731 or near the touch-sensitive surface 731), and drive a corresponding connection apparatus according to a preset program. Optionally, the touch-sensitive surface 731 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 780, and can receive a command transmitted by the processor 780 and execute the command. In addition, the touch-sensitive surface 731 may be implemented by using multiple types such as resistive, capacitive, infrared, and surface acoustic wave. In addition to the touch-sensitive surface 731, the input unit 730 may further include the another input device 732. Specifically, the another input device 732 may include but is not limited to one or more of a physical keyboard, a function key (such as a volume control key or a power-on/off key), a trackball, a mouse, a joystick, or the like.

The display unit 740 may be configured to display information input by the user or information provided to the user and various graphical user interfaces of the mobile phone. The graphical user interfaces may include a figure, a text, an icon, a video, and any combination thereof. The display unit 740 may include a display panel 741. Optionally, the display panel 741 may be configured in a form of an LCD (Liquid Crystal Display, liquid crystal display), an OLED (Organic Light-Emitting Diode, organic light-emitting diode), or the like. Further, the touch-sensitive surface 731 may cover the display panel 741. When the touch-sensitive surface 731 detects a touch operation on or near the touch-sensitive surface 731, the touch-sensitive surface 731 transmits the touch operation to the processor 780 to determine a type of a touch event. Then the processor 780 provides a corresponding visual output on the display panel 741 according to the type of the touch event. Although the touch-sensitive surface 731 and the display panel 741 are used as two independent components to implement input and input functions in FIG. 7, the touch-sensitive surface 731 and the display panel 741 may be integrated to implement input and output functions in some embodiments.

The mobile phone may further include at least one sensor 750, for example, a light sensor, a motion sensor, or another sensor. Specifically, the light sensor may include an ambient light sensor and a proximity sensor. The ambient light sensor may adjust luminance of the display panel 741 according to brightness of ambient light. The proximity sensor may turn off and/or backlight the display panel 741 when the mobile phone moves to an ear. As a type of motion sensor, a gravity acceleration sensor may detect acceleration magnitudes in all directions (generally three axes), and when the gravity acceleration sensor is stationary, may detect a magnitude and a direction of gravity, and may be configured to recognize a posture application of the mobile phone (such as switching between landscape and portrait, related games, and magnetometer posture calibration), vibration recognition related functions (such as a pedometer and stroke), and the like. As regards other sensors that can be configured for the mobile phone, such as a gyroscope, a barometer, a hygrometer, a thermometer, and an infrared sensor, details are not described herein.

The audio frequency circuit 760, a speaker 761, and a microphone 762 may provide an audio interface between the user and the mobile phone. The audio frequency circuit 760 may transmit an electrical signal converted from received audio data to the speaker 761, and the speaker 761 converts the electrical signal into an audio signal for outputting. On the other hand, the microphone 762 converts a captured audio signal into an electrical signal, and the audio frequency circuit 760 converts the received electrical signal into audio data, and then outputs the audio data to the processor 780 for processing; then the audio data is transmitted to another mobile phone through the RF circuit 710, or the audio data is output to the memory 720 for further processing. The audio frequency circuit 760 may further include an earbud jack to provide communication between an external earphone and the mobile phone.

Wi-Fi is a short-distance wireless transmission technology. By using the Wi-Fi module 770, the mobile phone may help the user to send and receive e-mails, browse web pages, access streaming media, and so on. Wi-Fi provides wireless broadband Internet access for the user. Although FIG. 7 shows the Wi-Fi module 770, it may be understood that, the Wi-Fi module 770 is not a necessary component of the mobile phone, and may be completely omitted according to a requirement without changing the essence of the present invention.

The processor 780 is a control center of the mobile phone. The processor 780 uses various interfaces and lines to connect all parts of the entire mobile phone, and executes various functions and data processing of the mobile phone by running or executing the software program and/or module stored in the memory 720 and invoking data stored in the memory 720, thereby performing overall monitoring on the mobile phone. Optionally, the processor 780 may include one or more processing cores. Preferably, the processor 780 may integrate an application processor and a modem processor. The application processor mainly processes the operating system, a user interface, an application program, and the like. The modem processor mainly processes wireless communication. It may be understood that, the modem processor may also not be integrated with the processor 780.

The mobile phone further includes the power source 790 (such as a battery) supplying power to each component. Preferably, the power source may be logically connected to the processor 780 by using a power management system, so as to implement functions such as charge and discharge management and power consumption management by using the power management system. The power source 790 may further include any component such as one or more than one direct current power source or alternating current power source, a recharging system, a power failure detection circuit, a power converter or an inverter, and a power status indicator.

Although not shown, the mobile phone may further include a camera 791, a Bluetooth module, and the like. The camera 791 is configured to expose an environment to obtain a frame image. In a manner, the camera 791 transfers the frame image obtained through exposure to the processor 780, so that the processor 780 performs processing such as denoising and enhancement to generate a picture that can be presented to the user. In another optional solution, the camera 791 includes an image processor chip. The image processing chip may perform initial processing on the frame image, and after performing initial processing on the frame image, transfer processed data to the processor 780, so that the processor 780 finally produces an image that can be presented to the user. Further, a quantity of the cameras 791 may be one or more.

Specifically, in this embodiment, the display unit of the mobile phone is a touchscreen display. The mobile phone further includes a memory and one or more than one program. The one or more than one program is stored in the memory. The one or more than one processor is configured to execute instructions included in the one or more than one program to perform the following operations:

scanning files in storage space according to a first scanning rule, and generating a file set according to the scanned files;

for each file in the file set, obtaining a last access time of the file, where the last access time indicates a last time at which a user accesses the file and the file is not modified;

obtaining a file attribute of the file, and querying an infrequently-used file recognition condition corresponding to the file attribute; and if the last access time of the file meets the infrequently-used file recognition condition, recognizing the file as an infrequently-used file.

Optionally, the file attribute is one or more of a type of the file or an application type of an application program to which the file belongs, and different file attributes correspond to different infrequently-used file recognition conditions.

Optionally, the processor is further configured to perform the following:

scanning application programs in the storage space according to a second scanning rule, and generating a program set according to the scanned application programs;

for each application program in the program set, obtaining a last access time of the application program;

obtaining an application attribute of the application program, and querying an infrequently-used application recognition condition corresponding to the application attribute; and if the last access time of the application program meets the infrequently-used application recognition condition, recognizing the application program as an infrequently-used application, where the last access time of the application program is a last time at which the application program switches to a foreground for running.

Optionally, the application attribute is an application type, and different application attributes correspond to different infrequently-used application recognition conditions.

Optionally, the processor is further configured to perform the following:

generating an infrequently-used data set according to all infrequently-used files in the file set and all infrequently-used application programs in the program set;

obtaining m file impact values of all the infrequently-used files and n application impact values of all the infrequently-used applications in the infrequently-used data set, where m and n are integers greater than 0;

obtaining a total impact value after performing weighted summation on the m file impact values and the n application impact values; and if the total impact value is greater than a total impact threshold, and a specified impact value in the m file impact values and the n application impact values is greater than a corresponding impact threshold, displaying a cleanup prompt message; or if the total impact value is greater than a total impact threshold, displaying a cleanup prompt message; or if a specified impact value in the m file impact values and the n application impact values is greater than a corresponding impact threshold, displaying a cleanup prompt message.

Optionally, the m file impact values include one or more of a file quantity, a file size, storage space usage, or a file read/write performance degradation rate; and the n application impact values include one or more of an application quantity, an application size, or storage space usage.

Optionally, the processor is further configured to perform the following:

receiving a trigger instruction generated according to the cleanup prompt message, and classifying the files and the application programs in the infrequently-used data set according to a preset classification rule;

receiving an instruction for selecting the infrequently-used data set, and determining a to-be-cleaned object selected by the selection instruction, where the to-be-cleaned object is one or more of the files or the application programs; and receiving an instruction for deleting the to-be-cleaned object, and deleting the to-be-cleaned object.

Optionally, the scanning, by the processor, files in storage space according to a first, and generating a file set according to the scanned files includes:

periodically scanning files whose file sizes are greater than a preset value in the storage space, and generating a file set according to the scanned files; or receiving an input scanning instruction, scanning files in the storage space according to one or more of a specified directory or a specified file type, and generating a file set according to the scanned files.

Optionally, the processor is further configured to perform the following:

obtaining p file impact values of all infrequently-used files in the file set, where p is an integer greater than 0;

obtaining a total impact value after performing weighted summation on the m file impact values; and if the total impact value is greater than a total impact threshold, and a specified impact value in the p file impact values is greater than a corresponding impact threshold, displaying a cleanup prompt message; or if the total impact value is greater than a total impact threshold, displaying a cleanup prompt message; or if a specified impact value in the p file impact values is greater than a corresponding impact threshold, displaying a cleanup prompt message.

Optionally, the processor is further configured to perform the following:

receiving a trigger instruction generated according to the cleanup prompt message, and classifying all the infrequently-used files according to a preset classification rule;

receiving an instruction for selecting all the infrequently-used files, and determining at least one infrequently-used file selected by the selection instruction; and receiving an instruction for deleting the at least one infrequently-used file, and deleting the at least one infrequently-used file.

Optionally, obtaining, by the processor, the application type of the application program includes:

obtaining the application type of the application program from an application store; or obtaining the application type of the application program according to a package name of the application program.

This embodiment of the present invention is based on a same idea as the method embodiments 1 to 3 and has a same technical effect as the method embodiments. For a specific process, refer to the descriptions in the method embodiments 1 to 3. Details are not further described herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (Read-Only Memory, ROM), or a random access memory (Random Access Memory, RAM).

What is disclosed above is merely examples of embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method for recognizing infrequently-used data, comprising:

scanning files in a memory according to a first scanning rule;

generating a file set according to the files scanned;

for each file in the file set, obtaining a last access time of the file, the last access time indicating a time when the file was last accessed and not modified;

obtaining a file attribute of the file;

querying an infrequently-used file recognition condition corresponding to the file attribute;

recognizing the file as an infrequently-used file when the last access time of the file meets the infrequently-used file recognition condition;

scanning application programs in the memory according to a second scanning rule;

generating a program set according to the application programs scanned;

for each application program in the program set, obtaining a last access time of the application program;

obtaining an application attribute of the application program;

querying an infrequently-used application recognition condition corresponding to the application attribute; and recognizing the application program as an infrequently-used application when the last access time of the application program meets the infrequently-used application recognition condition, the last access time of the application program being a time when the application program last switched to running in a foreground generating an infrequently-used data set comprising infrequently-used files in the file set and infrequently-used application programs in the program set;

obtaining m file impact values of the infrequently-used files and n application impact values of the infrequently-used applications in the infrequently-used data set, m and n being integers greater than zero;

calculating a total impact value of a weighted summation of the m file impact values and the n application impact values; and when the total impact value is greater than a total impact threshold, a specified impact value in the m file impact values is greater that a corresponding m impact threshold value and specified impact value in the n application impact values is greater than a corresponding impact threshold, displaying a cleanup prompt message.

2. The method of claim 1, wherein the file attribute is one or more of a type of the file or an application type of an application program to which the file belongs, and different file attributes correspond to different infrequently-used file recognition conditions.

3. The method of claim 1, wherein the application attribute is an application type, and different application attributes correspond to different infrequently-used application recognition conditions.

4. The method of claim 1, wherein the m file impact values comprise one or more of a file quantity, a file size, memory usage, or a file read/write performance degradation rate, and the n application impact values comprising one or more of an application quantity, an application size, or memory usage.

5. The method of claim 4, further comprising:
receiving a trigger instruction that is generated according to the cleanup prompt message;
classifying the files and the application programs in the infrequently-used data set according to a preset classification rule;
receiving an instruction for selecting the infrequently-used data set;
determining a to-be-cleaned object according to the instruction for selecting the infrequently-used data set, the to-be-cleaned object being at least one of the files or the application programs;
receiving an instruction for deleting the to-be-cleaned object; and
deleting the to-be-cleaned object according to the instruction for deleting the to-be-cleaned object.

6. The method of claim 1, further comprising:
obtaining p file impact values corresponding to all of infrequently-used files in the file set, p being an integer greater than 0;
obtaining an m total impact value according to a weighted summation on the m file impact values; and
when the m total impact value is greater than an m total impact threshold and a specified impact value in the p file impact values is greater than a corresponding impact threshold, displaying a cleanup prompt message.

7. The method of claim 6, further comprising:
receiving a trigger instruction that is generated according to the cleanup prompt message;
classifying all the infrequently-used files according to a preset classification rule;
receiving an instruction for selecting all the infrequently-used files; determining at least one infrequently-used file according to the instruction for selecting all the infrequently-used files;
receiving an instruction for deleting the at least one infrequently-used file; and
deleting the at least one infrequently-used file according to the instruction for deleting the at least one infrequently-used file.

8. A terminal, comprising:
a memory storing instructions; and
a processor coupled to the memory and configured to execute the instructions, the instructions causing the processor to be configured to:
scan files in a memory according to a first scanning rule;
generate a file set according to the scanned files;
for each file in the file set, obtain a last access time of the file, the last access time indicating a time when the file was last accessed and not modified;
a file attribute of the file;
query an infrequently-used file recognition condition corresponding to the file attribute;
recognize the file as an infrequently-used file when the last access time of the file meets the infrequently-used file recognition condition;
scanning application programs in the memory according to a second scanning rule;
generate a program set according to the application programs scanned;
for each application program in the program set, obtaining a last access time of the application program;
obtain an application attribute of the application program;
query an infrequently-used application recognition condition corresponding to the application attribute; and
recognize the application program as an infrequently-used application when the last access time of the application program meets the infrequently-used application recognition condition, the last access time of the application program being a time when the application program last switched to running in a foreground
generate an infrequently-used data set comprising infrequently-used files in the file set and infrequently-used application programs in the program set;
obtain m file impact values of the infrequently-used files and n application impact values of the infrequently-used applications in the infrequently-used data set, m and n being integers greater than zero;
calculate a total impact value of a weighted summation of the m file impact values and the n application impact values; and
when the total impact value is greater than a total impact threshold, a specified impact value in the m file impact values is greater that a corresponding m impact threshold value and a specified impact value in the n application impact values is greater than a corresponding impact threshold, display a cleanup prompt message.

9. The terminal of claim 8, wherein the file attribute is one or more of a type of the file or an application type of an application program to which the file belongs, and different file attributes correspond to different infrequently-used file recognition conditions.

10. The terminal of claim 9, wherein the instructions further cause the processor to be configured to:
obtain p file impact values corresponding to all of all infrequently-used files in the file set;

obtain an m total impact value after a weighted summation on the p file impact values; and when the m total impact value is greater than a total impact threshold and a specified impact value in the p file impact values is greater than a corresponding impact threshold, display a cleanup prompt message.

11. The terminal of claim 10, wherein the instructions further cause the processor to be configured to:
receive a trigger instruction that is generated according to the cleanup prompt message;
classify all the infrequently-used files according to a preset classification rule;
receive an instruction for selecting all the infrequently-used files;
determine at least one infrequently-used file according to the instruction for selecting all the infrequently-used files;
receive an instruction for deleting the at least one infrequently-used file; and
delete the at least one infrequently-used file according to the instruction for deleting the at least one infrequently-used file.

12. The terminal of claim 8, wherein the application attribute is an application type, and different application attributes correspond to different infrequently-used application recognition conditions.

13. The terminal of claim 8, wherein the m file impact values comprise one or more of a file quantity, a file size, memory usage, or a file read/write performance degradation rate, and the n application impact values comprising one or more of an application quantity, an application size, or memory usage.

14. The terminal of claim 13, wherein the instructions further cause the processor to be configured to:
receive a trigger instruction that is generated according to the cleanup prompt message;
classify the files and the application programs in the infrequently-used data set according to a preset classification rule;
receive an instruction for selecting the infrequently-used data set;
determine a to-be-cleaned object according to the instruction for selecting the infrequently-used data set, the to-be-cleaned object being at least one of the files or the application programs;
receive an instruction for deleting the to-be-cleaned object; and
delete the to-be-cleaned object according to the instruction for deleting the to-be-cleaned object.

15. The terminal of claim 14, wherein the instructions further cause the processor to be configured to:
periodically scan files whose file sizes are greater than a preset value in the memory, and generate a file set according to the scanned files; or
receive an input scanning instruction; and
scan files in the memory according to one or more of a specified directory or a specified file type, and generate a file set according to the scanned files.

* * * * *